US006602300B2

(12) United States Patent
Ushioda et al.

(10) Patent No.: US 6,602,300 B2
(45) Date of Patent: Aug. 5, 2003

(54) APPARATUS AND METHOD FOR RETRIEVING DATA FROM A DOCUMENT DATABASE

(75) Inventors: Akira Ushioda, Kanagawa (JP); Masaru Fuji, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/145,969

(22) Filed: Sep. 3, 1998

(65) Prior Publication Data

US 2002/0007384 A1 Jan. 17, 2002

(30) Foreign Application Priority Data

Feb. 3, 1998 (JP) ............................. 10-021631

(51) Int. Cl.$^7$ .......................... G06F 15/00; G06F 17/21; G06F 7/00
(52) U.S. Cl. ............................. 715/536; 707/5; 704/9; 704/10
(58) Field of Search ........................ 707/536, 5; 704/10, 704/2, 3, 4, 9; 715/536

(56) References Cited

U.S. PATENT DOCUMENTS

| | | | | |
|---|---|---|---|---|
| 5,278,980 A | * | 1/1994 | Pederson et al. | 707/4 |
| 5,301,109 A | * | 4/1994 | Landauer et al. | 704/9 |
| 5,845,143 A | * | 5/1995 | Yamauchi et al. | 704/2 |
| 5,966,719 A | * | 5/1995 | Okumura | 707/536 |
| 5,987,402 A | * | 1/1996 | Murata et al. | 704/2 |
| 6,047,299 A | * | 3/1997 | Kaijima | 707/532 |
| 5,659,765 A | * | 8/1997 | Nii | 704/4 |
| 5,675,815 A | * | 10/1997 | Yamauchi et al. | 707/530 |
| 6,006,221 A | * | 12/1999 | Liddy et al. | 707/5 |
| 6,055,528 A | * | 4/2000 | Evans | 707/5 |
| 6,292,771 B1 | * | 9/2001 | Haug et al. | 704/9 |

OTHER PUBLICATIONS

Hull, David A. et al., Querying across languages: a dictionary–based approach to multilingual information retrieval, Annual ACM Conference on Research and Development in Information Retrieval, Aug. 18–22, 1996, pp. 49–57.
Ballesteros, Lisa et al., Phrasal translation and query expansion techniques for cross–language information retrieval, Annual ACM Conference on Research and Development in Information Retrieval, Jul. 27–31, 1997, pp. 84–91.
Reithinger, N. et al., Predicting dialogue acts for a speech–to–speech translation system, IEEE Spoken Language, Oct. 3–6, 1996, vol. 2, pp. 654–657.*

* cited by examiner

Primary Examiner—Joseph H. Feild
Assistant Examiner—William L. Bashore
(74) Attorney, Agent, or Firm—Staas & Halsey LLP

(57) ABSTRACT

When a keyword described in Japanese is input, the input keyword is converted from Japanese into English. Thus, a retrieval keyword described in English is generated based on the input keyword described in Japanese. Documents that are described in English and that contain the retrieval keyword described in English are retrieved from a database. The retrieved documents are translated from English into Japanese. The documents translated into Japanese are compared with the input keyword described in Japanese. Thus, the validity of the results retrieved from the database is evaluated. Thus, even if the language of a database from which the data is retrieved is different from the language of the input keyword, retrieved results exactly based on the input keyword can be output.

37 Claims, 37 Drawing Sheets

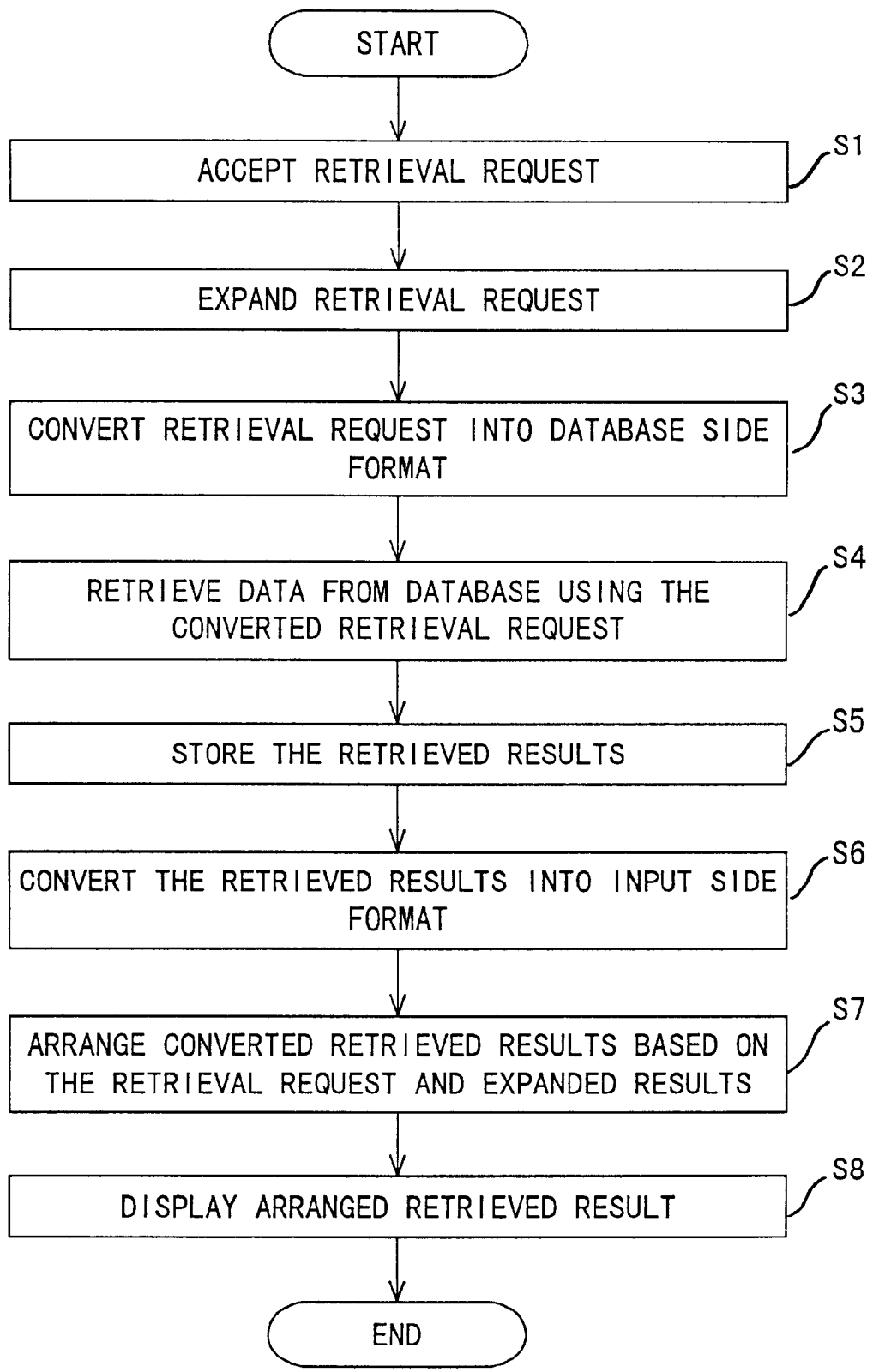
F I G. 4

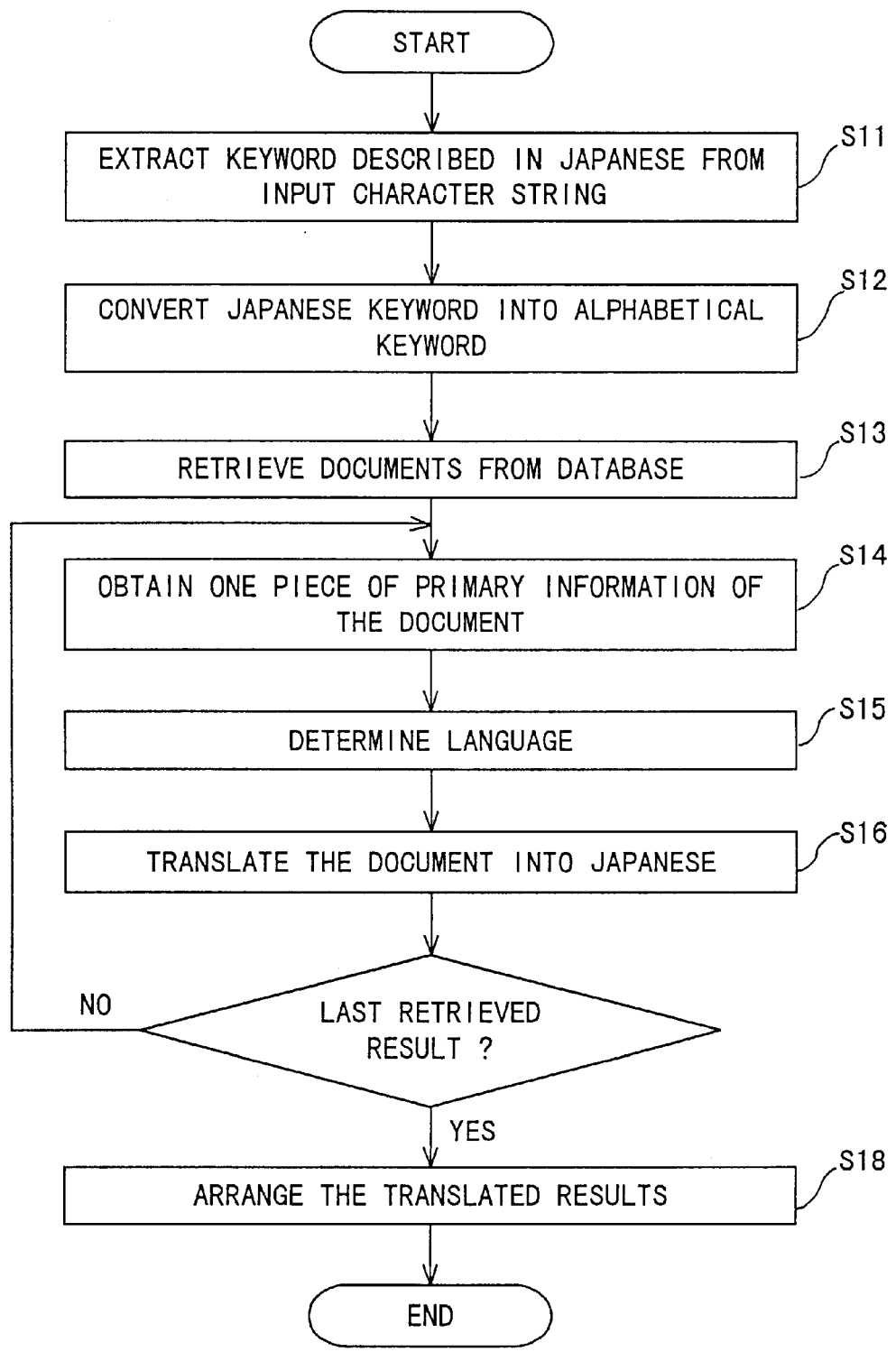
F I G. 5

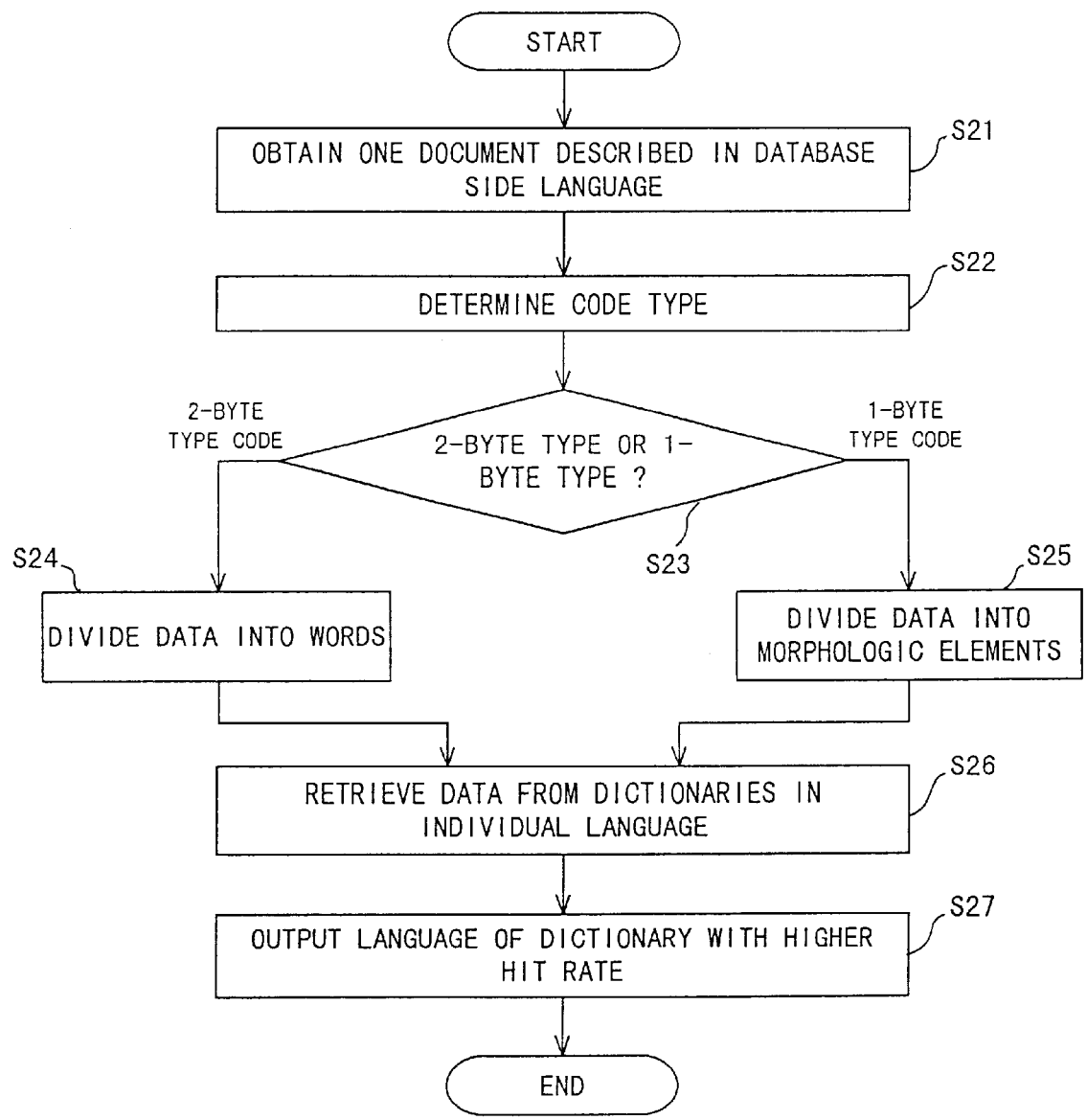
F I G. 6

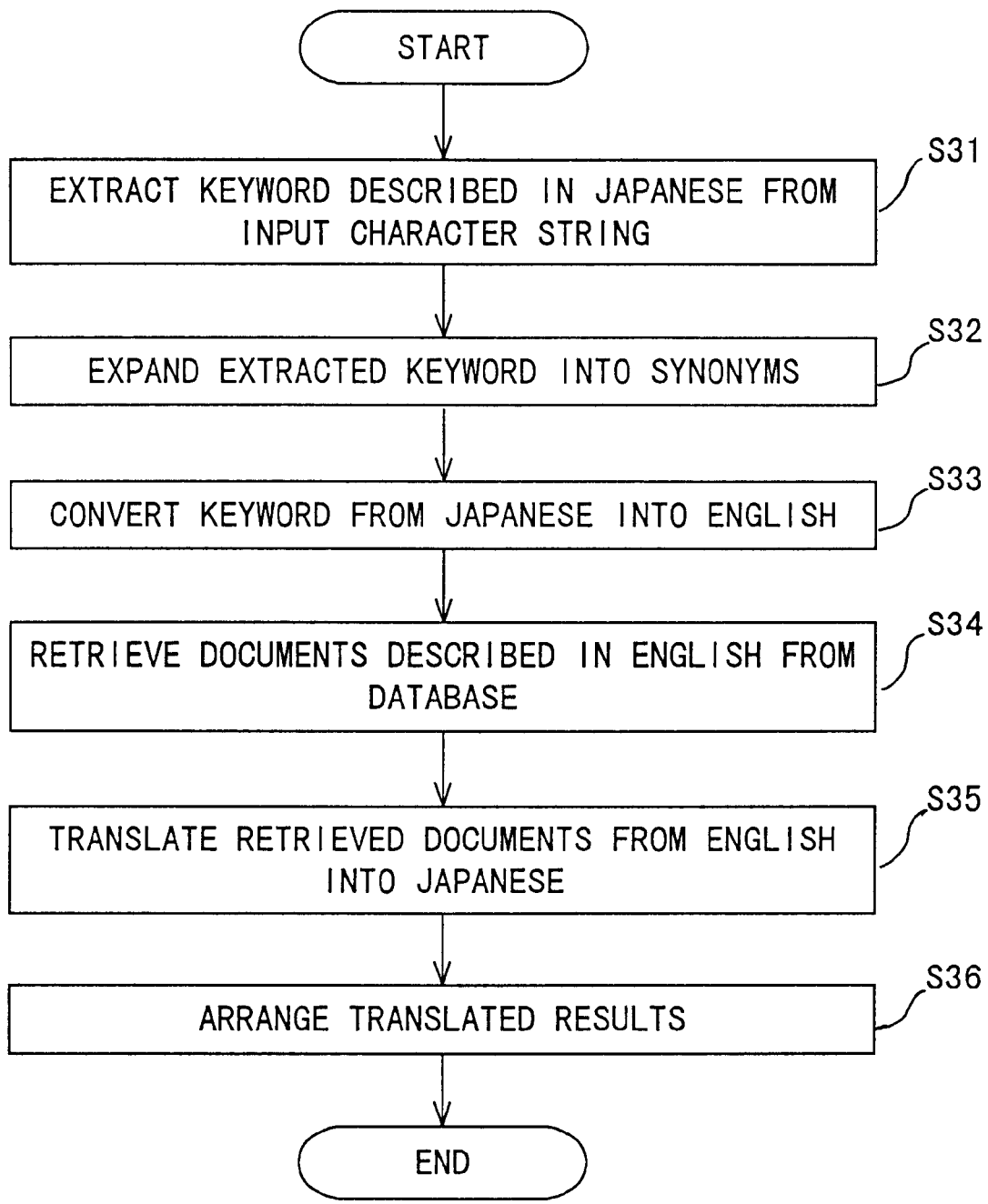
F I G. 7

DOCUMENT A'  ...橋本首相...

DOCUMENT B'  ...橋本氏..

DOCUMENT C'  ...橋本聖子...

DOCUMENT D'  ...橋本首相...

FIG. 11A

DOCUMENT A'  ...橋本首相...

DOCUMENT D'  ...橋本首相...

DOCUMENT B'  ...橋本氏..

DOCUMENT C'  ...橋本聖子...

FIG. 11B

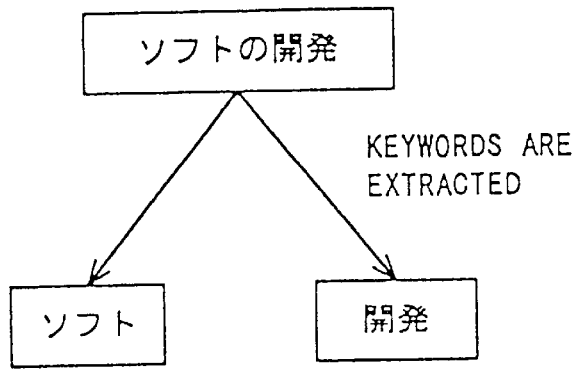
FIG. 12A
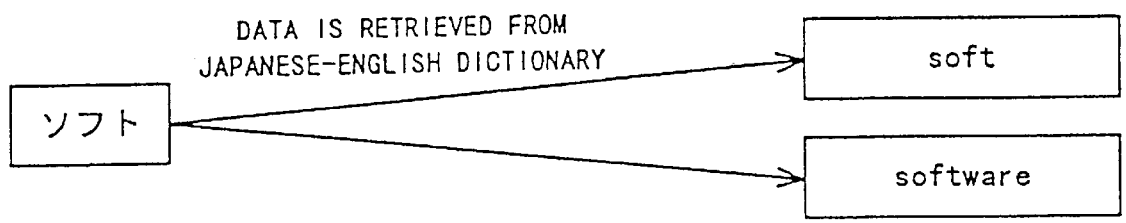
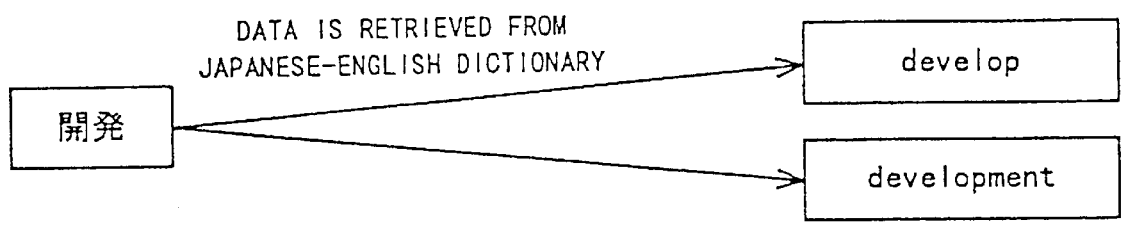
FIG. 12B

TRANSLATED RESULTS OF
RETRIEVED RESULTS

ORIGINAL
KEYWORDS

| …開発のために低金利の融資を… | DOCUMENT 1' |
| 与えられたデータを処理するためのソフトを開発する… | DOCUMENT 2' |

ソフト 開発

| …経済開発は軟着陸に… | DOCUMENT 3' |
| …ソフトの開発方法は… | DOCUMENT 4' |

FIG. 18A

ARRANGED RESULTS OF
TRANSLATED RESULTS OF
RETRIEVED RESULTS

ORIGINAL
KEYWORDS

| 与えられたデータを処理するためのソフトを開発する… | DOCUMENT 2' |

ソフト 開発

| …ソフトの開発方法は… | DOCUMENT 4' |

FIG. 18B

```
┌─────────────────────────────┐
│ There is a pen on the       │
│ table.  And there are       │
│ books on the floor.  I      │
│ also see cushions on the    │
│ sofa.                       │
└─────────────────────────────┘
              │
              │ SENTENCE IS EXTRACTED AND
              │ THEN TRANSLATED FROM
              │ ENGLISH INTO JAPANESE
              ▼
┌─────────────────────────────┐
│ そして、床の上には本がある。    │
└─────────────────────────────┘
```

F I G. 2 2

F I G. 24

テーブルの上にはペンがある。そして、床の上には本がある。また、ソファの上にはクッションが見える。

PARAGRAPH IS EXTRACTED AND TRANSLATED xxxxx xxxxxxxxxx xx x xxxxx,
xxxxx xxxx xx xxxxx.  yyyy yy
yyy yyyyy.

There is a pen on the table.
And there are books on the
floor. I also see cushions on
the sofa.

aaa aaaaa aa a aaaa, aaaa aaa
aaa aaaa a aaa.  bb bbb bbbb.

| Document | English | | Japanese |
|---|---|---|---|
| DOCUMENT 1 | ...soft loans to develop... | TRANSLATED FROM ENGLISH INTO JAPANESE → | ...開発のために低金利の融資を... | DOCUMENT 1' |
| DOCUMENT 2 | ...software for processing the given data is developed... | TRANSLATED FROM ENGLISH INTO JAPANESE → | 与えられたデータを処理するためのソフト/ソフトウェアを開発する... | DOCUMENT 2' |
| DOCUMENT 3 | ...soft lading for economic development... | TRANSLATED FROM ENGLISH INTO JAPANESE → | ...経済開発は軟着陸に... | DOCUMENT 3' |
| DOCUMENT 4 | ...the development method for the software is... | TRANSLATED FROM ENGLISH INTO JAPANESE → | ...ソフト/ソフトウェアの開発方法は... | DOCUMENT 4' |

FIG. 27B

TRANSLATED RESULTS OF RETRIEVED RESULTS

...ソフトの開発方法は... — DOCUMENT 4'

与えられたデータを処理するためのソフトを開発する... — DOCUMENT 2'

...経済開発は軟着陸に... — DOCUMENT 3'

...開発のために低金利の融資を... — DOCUMENT 1'

FIG. 28A

TRANSLATED RESULTS OF RETRIEVED RESULTS

...ソフトの開発方法は... — DOCUMENT 4'

与えられたデータを処理するためのソフトを構築する... — DOCUMENT 9'

...経済開発は軟着陸に... — DOCUMENT 3'

...開発のために低金利の融資を... — DOCUMENT 1'

FIG. 28B

TRANSLATED RESULTS OF RETRIEVED
RESULTS FROM DATABASE DESCRIBED
IN ENGLISH

...経済開発は軟着陸に...

...ソフトの開発方法は...

TRANSLATED RESULTS OF RETRIEVED
RESULTS FROM DATABASE DESCRIBED
IN FRENCH

RETRIEVED RESULTS FROM DATABASE
DESCRIBED IN JAPANESE

...開発のために低金利の融資を...

与えられたデータを処理するための
ソフトを開発する...

TRANSLATED RESULT OF RETRIEVED
RESULTS FROM DATABASE DESCRIBED
IN ENGLISH

APPARATUS AND METHOD FOR RETRIEVING DATA FROM A DOCUMENT DATABASE

BACKGROUND OF THE INVENTION

1. Field of the Invention

The present invention relates to an information retrieving apparatus and a method thereof, in particular, to those suitable in the case that the language of an input keyword is different from the language of a database from which data is retrieved.

2. Description of the Related Art

In a conventional information retrieving apparatus, when the language of a keyword that is input by a user (this language is hereinafter referred to as input side language) is different from the language of a database from which data corresponding to the input keyword is retrieved (hereinafter this language is referred to as database side language), data is retrieved through a machine-translating process.

Here, we use the word "keyword" as the user query or the user input to the apparatus.

In other words, the language of the input keyword language is converted into the language of the database. With the converted keyword, data is retrieved from the database. The retrieved results in the database side language are converted into the input side language and then displayed on a monitor.

In an information retrieving apparatus using a conventional machine-translating process, with synonyms expanded from an input keyword, a hit rate is increased. In addition, an apparatus that performs logical operations for expanded keywords so as to retrieve data has been proposed.

Moreover, a ranking retrieving process for ranking retrieved results of an information retrieving apparatus corresponding to match rates of retrieval keywords and retrieved data has been used. In the ranking retrieving process, the retrieved results are ranked with keywords converted into the database side language. The ranked results are converted into the input side language and presented to the user.

Now, assume that by inputting a keyword written in Japanese, data corresponding to the keyword is retrieved from a database described in English. In this case, the input keyword described in Japanese is converted into an equivalent keyword described in English. With the keyword described in English, data is retrieved from the database described in English. The retrieved results described in English are translated into Japanese. Thereafter, the retrieved results described in Japanese are presented to the user. In the ranking retrieving process, the retrieved results described in English are ranked with keywords converted into English. The ranked results are translated into Japanese and then provided to the user.

However, in the information retrieving apparatus using the conventional machine-translating process, when an input keyword is expanded into synonyms and a keyword described in the input side language is translated into the database side language, some variation in meaning may take place. In other words, the nuance of a keyword described in the input side language may be different from the nuance of a keyword described in the database side language. Thus, data that does not directly correlate with a keyword described in the input side language may be retrieved. In such a situation, when the retrieved results described in the database side language are ranked using the keyword translated into the database side language, the nuance of the keyword described in the input side language is not reflected to the ranked results described in the database side language. Consequently, the ranked results may be contrary to the intention of the user.

For example, when data is retrieved from a database described in English with a keyword input in Japanese, the retrieved results are ranked by comparing the keyword converted into English with the retrieved results described in English. Thus, documents containing the keyword converted into English are highly ranked. Unless a keyword is correctly converted from Japanese into English, documents that do not reflect the meaning of the keyword described in Japanese are highly ranked.

SUMMARY OF THE INVENTION

An object of the present invention is to provide an information retrieving apparatus that can output retrieved results corresponding to an input keyword even if the language of the input keyword is different from the language of a database from which data is retrieved.

According to an aspect of the present invention, an information retrieving apparatus comprises an inputting unit for inputting a retrieval request described in a first data format, a generating unit for generating retrieval information described in a second data format based on the retrieval request described in the first data format, a retrieving unit for retrieving data described in the second data format based on the retrieval information described in the second data format, a converting unit for converting the retrieved results from the second data format into the first data format, and an evaluating unit for evaluating the retrieved results translated into the first data format based on the retrieval request described in the first data format.

Thus, even if the data format of the retrieved results is different from the data format of the retrieval request, the data format of the retrieved results can be matched with the data format of the retrieval request. Consequently, the retrieved results can be evaluated without need to convert the data format of the retrieval request. As a result, the retrieved results exactly corresponding to the retrieval request can be obtained free of any variation in meaning caused by a conversion process of the data format of the retrieval request.

According to a further aspect of the present invention, the retrieval information described in the second data format is generated based on the key information (keyword) extracted from the retrieval request in the first data format.

Thus, since the key information is extracted in the first data format, the key information can be extracted free of a variation in meaning caused by a conversion process of data, in comparison with the case that the key information is extracted after the data format is converted into the second data format. Consequently, the key information can be extracted exactly corresponding to a retrieval request.

According to an aspect of the present invention, the retrieval information described in the second data format is generated based on the expanded results in the first data format.

Thus, since the retrieval request is expanded in the first data format, the retrieval request can be expanded free of a variation in meaning caused by the conversion process of data in comparison with the case that the retrieval request is expanded after the data format is converted into the second data format.

According to an aspect of the present invention, the retrieval information described in the second data format is generated based on the results of a logical operation in the first data format.

Thus, since the logical operation of the retrieval request is performed in the first data format, the logical operation can be performed free of a variation in meaning of the conversion process of data in comparison with the case that the logical operation is performed after the data format is converted into the second data format. Consequently, the logical operation can be performed exactly corresponding to the retrieval request.

According to an aspect of the present invention, the retrieved results described in the second data format are converted into the first data format. The retrieved results converted into the first data format are evaluated based on the key information, the expanded results, or the results of the logical operation.

Thus, even if data whose data format is different from the data format of the retrieval request is retrieved, the results retrieved over a wide range can be evaluated without need to convert the data format of the retrieval request. Consequently, the retrieved results can be evaluated exactly corresponding to the retrieval request free of a variation in meaning of a nuance due to the conversion process of the retrieval request.

According to an aspect of the present invention, the retrieved results are ranked based on the evaluated results thereof.

Thus, the retrieved results can be easily selected.

According to an aspect of the present invention, an information retrieving apparatus comprises a retrieval request inputting unit for inputting a retrieval request described in an input side format, a first format converting unit for converting the retrieval request from the input side format into a database side format, a retrieving process unit for retrieving data from the database based on the converted results of the first format converting unit, a second format converting unit for converting the results retrieved from the database from the database side format into the input side format, a retrieved results arranging unit for arranging the retrieved results converted into the input side format based on the retrieval request described in the input side format, and a retrieved results displaying unit for displaying the data arranged by the retrieved results arranging unit.

Thus, even if the retrieval request whose data format is different from the data format of the database is input, since the data format of the results retrieved from the database is matched with the data format of the retrieval request, the retrieval request can be directly compared with the converted results of the retrieved results without need to convert the data format of the retrieval request. Thus, the retrieved results exactly corresponding to the retrieval request can be extracted.

According to an aspect of the present invention, the conversion between the input side format and the database side format is a language translating process or a dictionary retrieving process.

Thus, even if the language of the input keyword is different from the language of the database from which data is retrieved, the results retrieved from the database can be determined in the language of the input keyword. Consequently, the accuracy of a data retrieving process through a machine-translating process can be improved.

According to an aspect of the present invention, after the database side language is automatically determined, a translating process or a dictionary retrieving process is performed.

Thus, the results retrieved from the database can be converted into the language of the retrieval request without need to recognize the language of the database to be retrieved from on the retrieval request side. Consequently, the results retrieved from the database can be determined based on the language on the retrieval request side.

According to an aspect of the present invention, only sentences that contain a retrieval keyword are converted in the results retrieved from the database.

Thus, information irrelevant to a retrieval request is discarded before performing the conversion. Consequently, the process time of the retrieving process through a machine-translating process can be shortened.

According to an aspect of the present invention, only paragraphs that contain the retrieval keyword are converted in the results retrieved from the database.

Thus, information irrelevant to the retrieval request is discarded thereby preserving the accuracy of the retrieval. Consequently, the process time of the retrieving process through a machine-translating process can be shortened.

According to an aspect of the present invention, the retrieval request is expanded in the input side format. The expanded results are converted into the database side format. Data is retrieved from the database based on the expanded results described in the database side format.

Thus, the retrieval request can be expanded free of a variation in meaning caused by the data conversion process. Consequently, the expanded results can closely reflect the contents of the retrieval request. As a result, the accuracy of the retrieving process for the database through the data conversion process can be improved.

According to an aspect of the present invention, the retrieved results converted into the input side format are arranged based on a weight assigned to the expanded results.

Thus, if a plurality of retrieved results corresponding to expanded results are obtained, the retrieved results can be easily arranged corresponding to the contents of the expanded results.

According to an aspect of the present invention, the retrieved results converted into the input side format are arranged based on a weight assigned to the converted result of the retrieval request.

Thus, if a plurality of retrieved results corresponding to the converted results of the retrieval request are obtained, the retrieved results can be easily arranged corresponding to the converted results of the retrieval requests.

According to an aspect of the present invention, data is retrieved based on each element of retrieval information, when a plurality of retrieval information is generated corresponding to the retrieval requests.

Thus, all information relevant to the retrieval request can be retrieved. Consequently, information corresponding to the retrieval request can be retrieved over a wide range.

According to an aspect of the present invention, the results retrieved from the database are converted in correspondence with each of a plurality of candidates, when a plurality of alternatives are generated for an element of a conversion result from the database side format into the input side format.

Thus, even if a variation in meaning takes place due to a conversion process of a data format, all candidates generated due to the variation in meaning can be presented. Consequently, desired data can be prevented from being lost against a variation in meaning caused by a conversion process of a data format. As a result, the accuracy of the retrieving process can be improved.

According to an aspect of the present invention, at most one converted result for the same retrieved result is selected when the plurality of candidate are generated by the conversion from the database side format into the input side format.

Thus, since redundantly retrieved results are discarded before presenting the retrieved results, the retrieving process can be effectively performed.

According to an aspect of the present invention, when a plurality of candidates are generated for elements of converted results from the database side format into the input side format, the plurality of candidates are expanded in the results retrieved from the database.

Thus, even if a variation in meaning takes place in a conversion process of a data format, all candidates generated due to the variation in meaning can be presented in the same retrieved results. Consequently, the result of the arithmetic operation can closely reflect the contents of the retrieval request. As a result, the accuracy of the retrieving process can be improved.

According to an aspect of the present invention, the retrieved results converted into the input side format are arranged based on the results of the logical arithmetic operation for the retrieval request described in the input side format.

Thus, the logical arithmetic operation can be performed for the retrieval request free of a variation in meaning of the conversion process. Consequently, the expanded results can closely reflect the contents of the retrieval request of the arithmetic operation. As a result, the accuracy of the retrieving process through the data conversion process can be improved.

According to an aspect of the present invention, the retrieved results converted into the input side format are arranged based on the correlation rate of the retrieval request described in the input side format and the retrieved results converted into the input side format.

Thus, since the retrieved results described in the database side format are compared in the input side format, the retrieved results exactly reflecting the retrieval request can be easily selected.

According to an aspect of the present invention, a portion that matches the retrieval request is highlighted in the retrieved results converted into the input side format.

Thus, the user can directly know the correlation between the retrieved results and the retrieval request. Consequently, the user can easily know the retrieved results that match the retrieval request.

According to an aspect of the present invention, a portion that matches the retrieval request and a portion that matches the expanded results of the retrieval request are highlighted in the retrieved results converted into the input side format to be separately distinguishable.

Thus, the correlation between the retrieved results and the retrieval request can be displayed over a wide range. Consequently, retrieved results that match the retrieval request and the retrieved results with correspondence to the retrieval request can be easily identified.

According to an aspect of the present invention, the retrieving process for the database and the conversion process for the retrieved results from the database side format into the input side format are performed in parallel.

Thus, data can be converted from a database side format into an input side format, at each time when a retrieval is finished. Consequently, the conversion process is performed before all retrieved results are accumulated. As a result, the conversion process can be performed at high speed.

According to an aspect of the present invention, the retrieved results are arranged according to the input side format. However, the retrieved results are displayed in the database side format.

Thus, since the conversion process from the database side format into the input side format is not properly performed, when the retrieved results are presented in the database side format to the user, the ranked results in the input side format can be affected to the results presented to the user.

According to an aspect of the present invention, the results retrieved from the database are ranked in the database side format. The highly ranked retrieved results are selected from among the ranked results described in the database side format. Only the highly ranked retrieved results are converted from the database side format into the input side format. By comparing the retrieval request described in the input side format with the highly ranked retrieved results that have been converted into the input side format, the retrieved results are arranged.

Thus, that lowly ranked retrieved results in the database side format can be suppressed from being converted. Consequently, the process time necessary for the retrieving process through the data conversion process can be shortened.

According to an aspect of the present invention, data is retrieved from a plurality of databases whose database side formats are different based on the retrieval request described in an input side format. The results retrieved from the databases are converted from the database side format into the input side format. The retrieved results are arranged.

Thus, even if the databases are described in various data formats, data can be retrieved from these databases based on one retrieval request at a time. The retrieved results described in the various data formats can be evaluated in the input side format. Consequently, data can be accurately retrieved over wide range.

According to an aspect of the present invention, the types of data formats are displayed corresponding to the results retrieved from the database.

Thus, even if the retrieved results are displayed in the input side format, the user can determine the data format of the database.

According to an aspect of the present invention, data is retrieved from the database using the retrieval request described in the input side format. The retrieved results are displayed. In addition, the retrieval request described in the input side format is converted into the database side format. Data is retrieved from the database using the converted retrieval request. These retrieved results are displayed at the same time.

Thus, data relevant to the retrieval request can be retrieved over a wide range and displayed.

According to an aspect of the present invention, the results retrieved from the database using the retrieval request described in the input side format and the results retrieved from the database using the retrieval request converted from the input side format into the database side format are displayed separately on the same screen.

Thus, the user can easily determine the databases from which the data is retrieved.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 4 is a flow chart showing an information retrieving process according to an embodiment of the present invention;

FIG. 5 is a flow chart showing an information retrieving process through a machine-translating process according to an embodiment of the present invention;

FIG. 6 is a flow chart showing a language determining process according to an embodiment of the present invention;

FIG. 7 is a flow chart showing an information retrieving process through a synonym expanding process according to an embodiment of the present invention;

FIG. 11A is a schematic diagram showing results translated from English into Japanese according to the first embodiment of the present invention;

FIG. 11B is a schematic diagram showing ranked results according to the first embodiment of the present invention;

FIG. 12A is a schematic diagram showing keyword extracted results according to the second embodiment of the present invention;

FIG. 12B is a schematic diagram showing results retrieved from a Japanese-English dictionary according to the second embodiment of the present invention;

FIGS. 18A and 18B are schematic diagrams for explaining an arranging method for translated results of retrieved results according to the first embodiment of the present invention;

FIG. 22 is a schematic diagram for explaining a translating method for retrieved results according to the first embodiment of the present invention;

FIG. 24 is a flow chart for explaining a translating method for retrieved results according to the second embodiment of the present invention;

FIG. 27B is a schematic diagram for explaining an outputting method for retrieved results according to the second embodiment of the present invention;

FIG. 28A is a schematic diagram for explaining an outputting method for retrieved results according to the third embodiment of the present invention;

FIG. 28B is a schematic diagram for explaining an outputting method for retrieved results according to the fourth embodiment of the present invention;

FIG. 31 is a schematic diagram showing display results of multi-language documents according to the first embodiment of the present invention;

FIG. 34 is a schematic diagram showing display results of multi-language documents according to the second embodiment of the present invention.

DESCRIPTION OF PREFERRED EMBODIMENTS

Next, with reference to the accompanying drawings, an information retrieving apparatus according to an embodiment of the present invention will be described.

Figure 1:
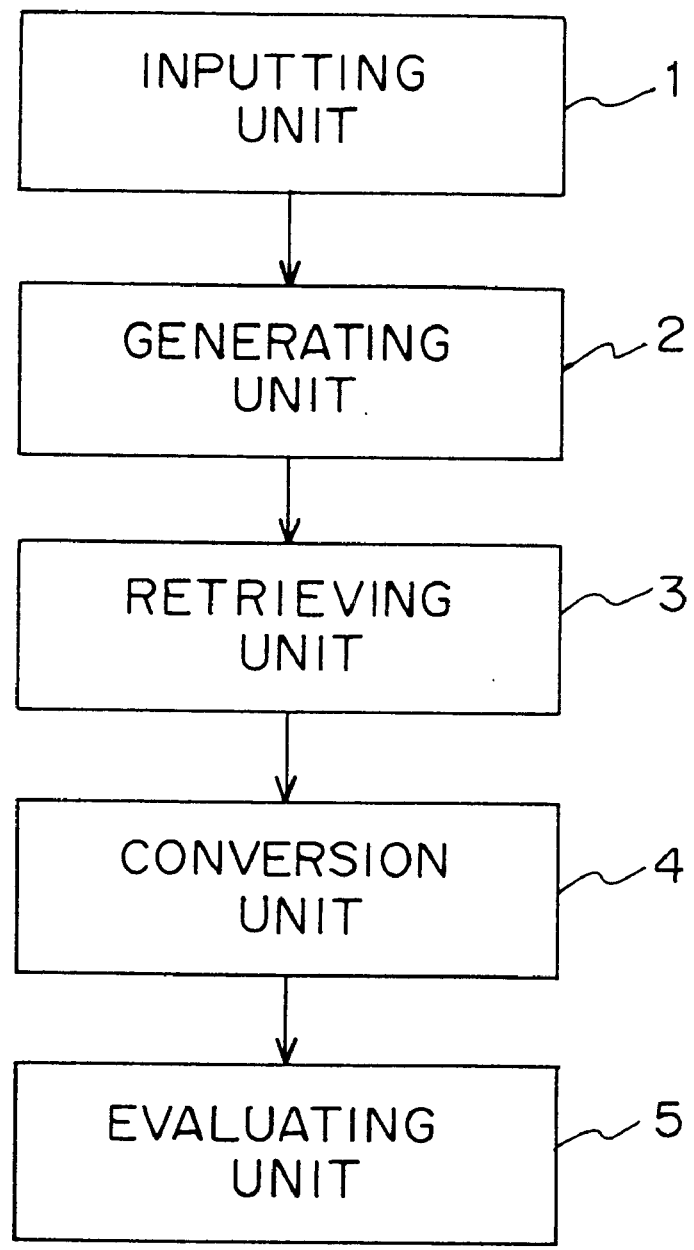
FIG. 1 is a block diagram showing the structure of an information retrieving apparatus according to a first embodiment of the present invention.

FIG. 1 is a block diagram showing the structure of an information retrieving apparatus according to an embodiment of the present invention.

In FIG. 1, an inputting unit 1 inputs a retrieval request described in a first data format. A generating unit 2 generates retrieval information described in a second data format based on the retrieval request described in the first data format. A retrieving unit 3 retrieves data described in the second data format based on the retrieval information described in the second data format. A converting unit 4 converts the retrieved results from the second data format into the first data format. An evaluating unit 5 evaluates the retrieved results converted into the first data format based on the retrieval request described in the first data format.

Thus, even if the data format of the retrieved results is different from the data format of the retrieval request, the data format of the retrieved result can be matched with the data format of the retrieval request. Thus, without need to convert the data format of the retrieval request, the evaluating unit 5 can evaluate the retrieved results in the data format of the retrieval request. Consequently, free of a variation in meaning caused by the conversion process of the data format of the retrieval request, data can be retrieved exactly faithful to the retrieval request.

Figure 2:
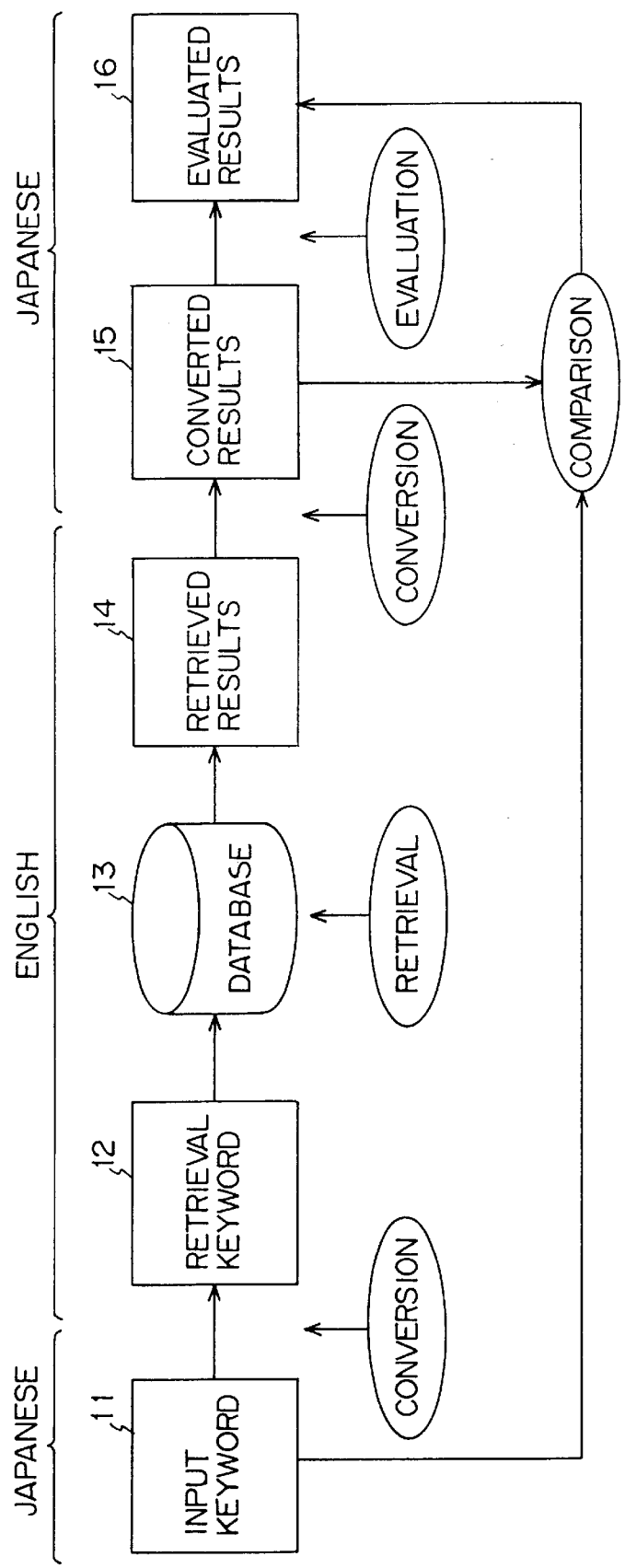
FIG. 2 is a schematic diagram for explaining an information retrieving method according to an embodiment of the present invention.

FIG. 2 is a schematic diagram for explaining an information retrieving method according to an embodiment of the present invention.

In FIG. 2, it is assumed that documents described in English have been stored in a database 13 and that a document corresponding to an input keyword 11 described in Japanese is retrieved from the database 13.

When an input keyword 11 described in Japanese is input, it is converted from Japanese into English. Thus, a retrieval keyword 12 described in English is generated corresponding to the input keyword 11 described in Japanese. Documents that are described in English and that contain the retrieval keyword 12 are retrieved from the database 13. The retrieved documents are output as retrieved results 14. When the retrieved results 14 are output, they are translated from English into Japanese. Thus, the documents described in English retrieved from the database 13 are converted into Japanese documents. When the retrieved results 14 are converted into Japanese, the converted results 15 are compared with the input keyword 11 described in Japanese so as to evaluate the validity of the retrieved results 14 retrieved from the database 13. For example, when the converted results 15 described in Japanese contain the input keyword 11 described in Japanese, the retrieved results 14 described in English which are retrieved from the database 13, are highly ranked as correspondence to the input keyword 11 described in Japanese. The converted results 15 corresponding to the retrieved results 14 are presented to the user.

Thus, when documents that are described in English and retrieved from the database 13 are translated into Japanese and then ranked, the converted results 15 can be directly compared with the input keyword 11 described in Japanese and thereby the retrieved results 14 can be evaluated. Consequently, even if there is a variation in meaning caused by the conversion process from the input keyword 11 described in Japanese into the retrieval keyword 12 described in English, the converted results 15 can be evaluated without need to convert the input keyword 11 from Japanese into English. Consequently, evaluated results 16 exactly faithful to the input keyword 11 can be obtained.

Figure 3:
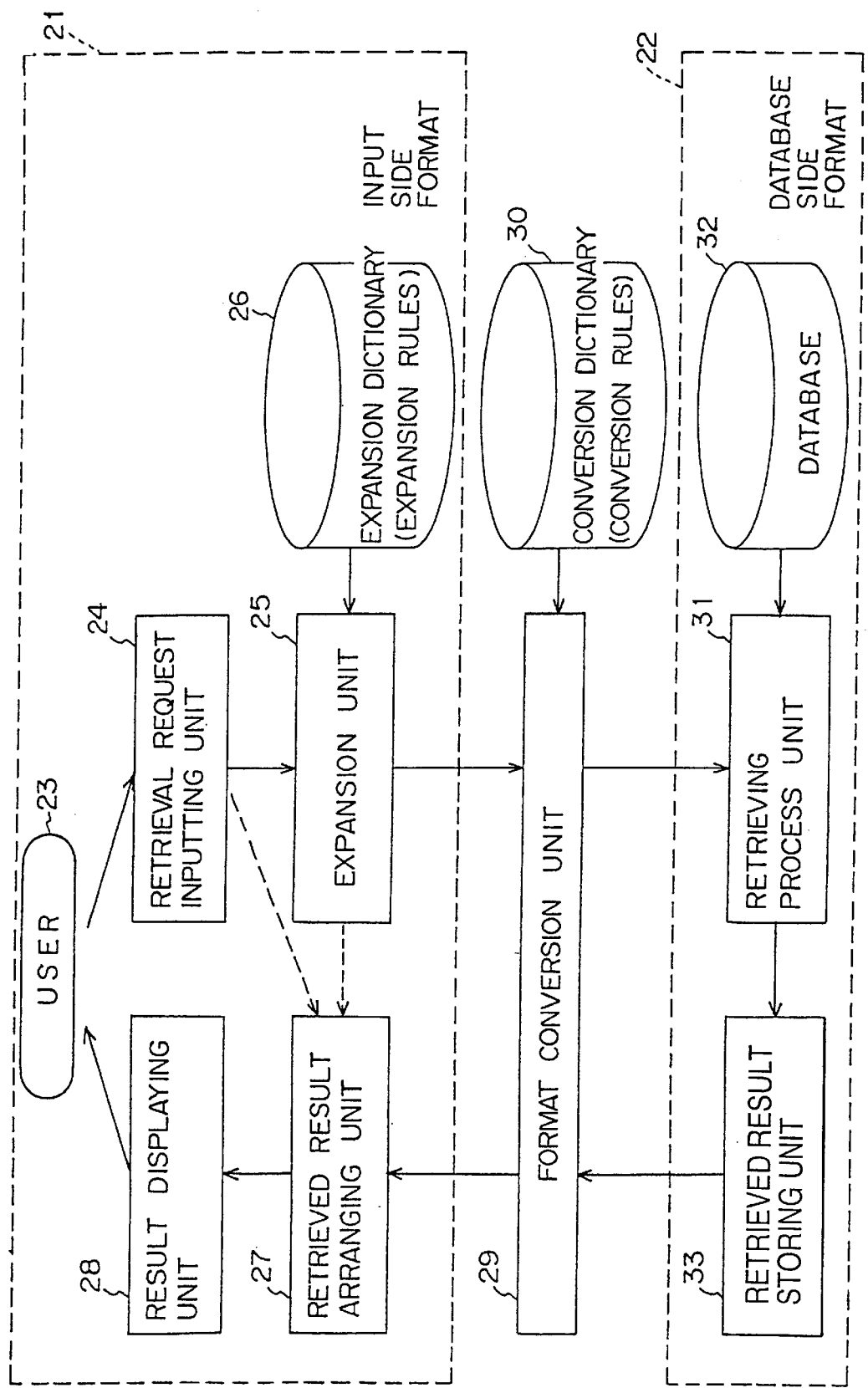
FIG. 3 is a block diagram showing the structure of an information retrieving apparatus according to a second embodiment of the present invention.

FIG. 3 is a block diagram showing the structure of an information retrieving apparatus according to a second embodiment of the present invention. In the second embodiment, the information retrieving apparatus retrieves data through an information format converting unit. By arranging retrieved results in the input side format, the information retrieving apparatus can display retrieved results corresponding to a retrieval request of the user more properly.

In FIG. 3, a user 23, a retrieval request inputting unit 24, a expanding unit 25, a expanding dictionary 26, a retrieved result arranging unit 27, and a result displaying unit 28 process information described in an input side format 21. On the other hand, a retrieving process unit 31, a database 32, and a retrieved result storing unit 33 process information described in a database side format 22.

The retrieval request inputting unit 24 accepts a retrieval request of the user 23 and supplies the retrieval request to the expanding unit 25. In addition, the retrieval request inputting unit 24 also supplies the retrieval request of the user 23 to the retrieved result arranging unit 27. The expanding unit 25 references expansion rules or the like stored in the expanding dictionary 26, expands the retrieval request received from the retrieval request inputting unit 24, and supplies the expanded results to a format translating unit 29. In addition, the expanding unit 25 also supplies the expanded results to the retrieved result arranging unit 27. The expanding dictionary 26 stores expansion rules or the like for expanding a retrieval request. The format translating unit 29 refers to conversion rules stored in a conversion dictionary 30 and converts the expanded results received from the expanding unit 25 from the input side format 21 into the database side format 22. The conversion dictionary 30 stores conversion rules for converting data from the input side format 21 into the database side format 22.

The retrieving and processing unit 31 retrieves data described in the database side format 22 from the database 32 based on the retrieval request converted into the database side format 22. The database 32 stores data described in the database side format 22. The retrieved result storing unit 33 stores data retrieved from the database 32. Data described in the database side format 22 is supplied from the retrieved result storing unit 33 to the format translating unit 29. The format translating unit 29 converts data received from the retrieved result storing unit 33 from the database side format 22 into the input side format 21 and supplies the converted data to the retrieved result arranging unit 27. The retrieved result arranging unit 27 arranges the retrieved results converted into the input side format 21 based on the retrieval request received from the retrieval request inputting unit 24 and the expanded results received from the expanding unit 25. The result displaying unit 28 presents data arranged by the retrieved result arranging unit 27 to the user 23.

FIG. 4 is a flow chart showing an information retrieving process according to an embodiment of the present invention.

In FIG. 4, the retrieval request inputting unit 24 accepts a retrieval request described in the input side format 21 (at step S1).

The retrieval request that is described in the input side format 21 and that is received from the retrieval request inputting unit 24 is expanded in the input side format 21 (at step S2).

The expanded results are converted from the input side format 21 into the database side format 22 (at step S3).

Data is retrieved from the database 32 using the retrieval request converted into the database side format 22 (at step S4).

The results retrieved from the database 32 are stored in the retrieved result storing unit 33 (at step S5).

The retrieved results stored in the retrieved result storing unit 33 are supplied to the format translating unit 29. The format translating unit 29 converts the retrieved results from the database side format 22 into the input side format 21 (at step S6).

The retrieved results converted into the input side format 21 are arranged using the retrieval request input by the user 23 and the expanded results of the retrieval request or the like (at step S7).

The arranged results are displayed in the input side format 21 and presented to the user 23 (at step S8).

Thus, by comparing the retrieved results obtained through the conversion process with the original retrieval request, the retrieved results that largely correlate with the original retrieval request input by the user 23 can be displayed. Thus, the user 23 can satisfactorily obtain ranked results.

Next, an information retrieving process through a machine-translating process will be described as an example of the operation of the information retrieving apparatus shown in FIG. 3.

When retrieving data from the database 32 through a machine-translating process, the user 23 inputs a keyword necessary for retrieving data from the database 32 to the retrieval request inputting unit 24. The keyword that is input to the retrieval request inputting unit 24 is described in the input side language. On the other hand, data stored in the database 32 is described in the database side language. Thus, the language of the keyword that is input to the retrieval request inputting unit 24 is different from the language of the data stored in the database 32. Thus, the keyword input by the user 23 described in the input side language is converted into the database side language.

When the keyword is converted into the database side language, the meaning thereof may vary. Thus, when the results retrieved from the database 32 are ranked using the converted keyword converted into the database side language, the variation in meaning which has occurred from the conversion of the keyword directly affects the ranked results. Thus, the intention of the user 23 may not be reflected on the ranked results.

To prevent such a problem, before the retrieved results are ranked, the results retrieved from the database 32 are converted into the input side language. The retrieved results converted into the input side language are compared with the keyword input in the input side language and then the compared results are ranked. In this case, since the retrieved results are ranked using the keyword before performing the language conversion, the retrieved results can be arranged free of a variation in meaning caused by the language conversion process of the keyword. Thus, the intention of the user 23 can be reflected on the ranked results.

FIG. 5 is a flow chart showing an information retrieving process through a machine-translating process according to an embodiment of the present invention. In this embodiment, before a translating process is performed, the database side language is determined by a language determining process.

In FIG. 5, a keyword described in Japanese is extracted from an input character string described in Japanese (at step S11).

The keyword is converted from Japanese into an alphabetical character string (at step S12).

Data is retrieved from the database using the keyword described alphabetically (at step S13).

One piece of primary information of the document retrieved from the database is obtained (at step S14).

The language of the primary information of the obtained document is determined (at step S15).

The retrieved document is converted from the language which is used to describe it into Japanese (at step S16).

After all the results retrieved from the database have been converted into Japanese (at step S17), the documents converted into Japanese are arranged using the input character string and keyword described in Japanese (at step S18).

FIG. 6 is a flow chart showing the language determining process according to an embodiment of the present invention.

In FIG. 6, one document described in the database side format is extracted (at step S21).

The code type of the extracted document is determined (at step S22). When the code type of the extracted document is two-byte type code (at step S23), the extracted document is divided into words (at step S24). When the code type of the extracted document is 1-byte type code (at step S23), the extracted document is divided into morphological elements (at step S25).

The obtained words or morphological elements are retrieved from dictionaries of various languages (at step S26). A dictionary of language with a higher hit rate is selected (at step S27).

FIG. 7 is a flow chart showing an information retrieving process through a synonym expanding process according to an embodiment of the present invention.

In FIG. 7, a keyword described in Japanese is extracted from an input character string described in Japanese (at step S31).

The extracted keyword described in Japanese is expanded into synonyms (at step S32).

The resultant keywords are translated from Japanese into English (at step S33).

Documents described in English are retrieved from a database described in English using the keywords described in English (at step S34).

The retrieved documents are translated from English into Japanese (at step S35).

Documents translated into Japanese are arranged using the input character string described in Japanese and the result of the synonym developing process in Japanese (at step S36).

Figure 8:
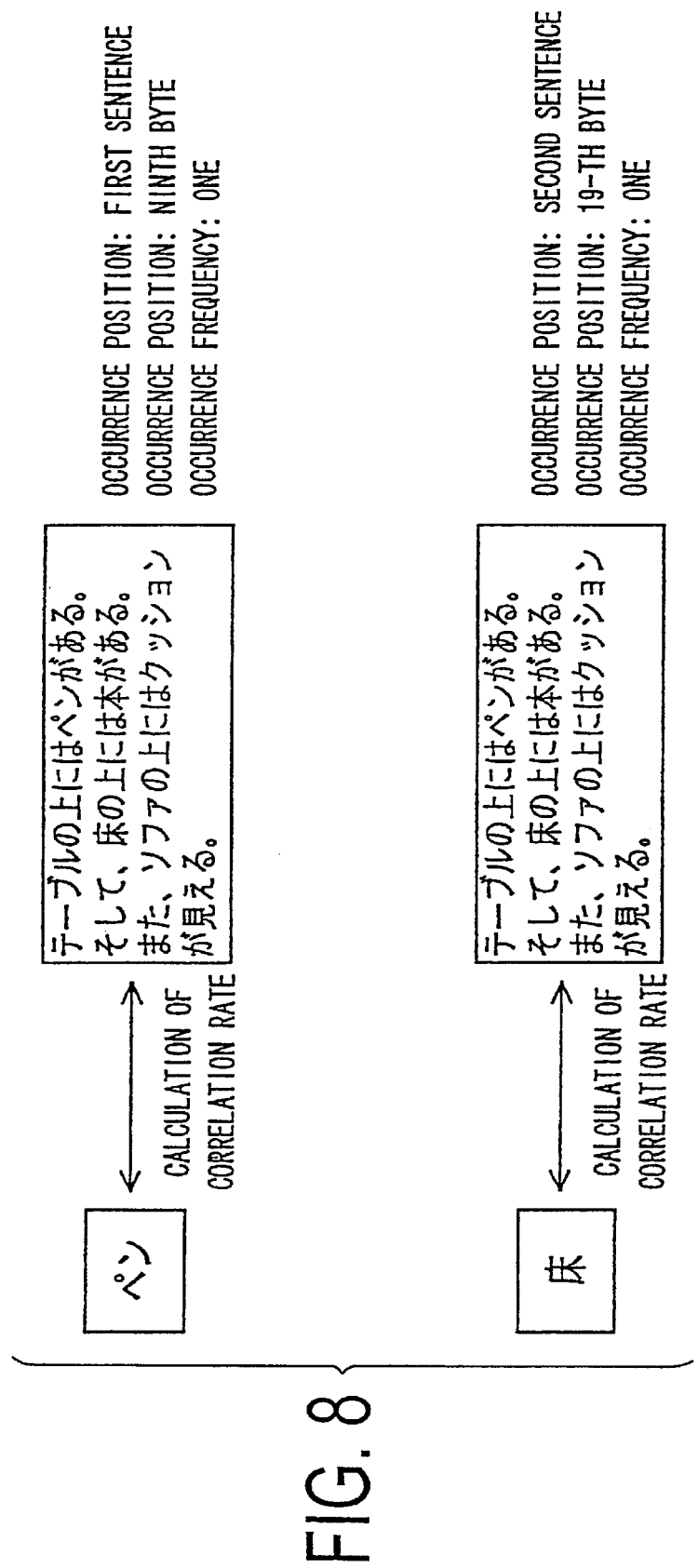
FIG. 8 is a schematic diagram for explaining a calculating method for the correlation rate of a keyword and documents according to an embodiment of the present invention.

FIG. 8 is a schematic diagram for explaining a calculating method for a correlation rate of a keyword and documents according to an embodiment of the present invention. To obtain the correlation rate between the keyword and the document, the occurrence position and the occurrence frequency of the keyword are calculated. The correlation rate of a keyword that occurs at a position close to the beginning of a document is highly scored by counting in units of sentences or in units of bytes. Alternatively, the correlation rate of a keyword that has a higher occurrence frequency of a retrieved document is highly scored.

For example, in FIG. 8, it is assumed that a document "テーブルの上にはペンがある。そして、床の上には本がある。また、ソファの上にはクッションが見える。 (There is a pen on the table. And there are books on the floor. I also see cushions on the sofa.)" is obtained corresponding to two keywords "ペン (pen)" and "床 (floor)".

With respect to the retrieved document, the occurrence position of the keyword "ペン" is in the first sentence, the ninth byte counted from the beginning of the document and the occurrence frequency is one. In addition, the occurrence position of the keyword "床" is in the second sentence, the 19th byte counted from the beginning of the document and the occurrence frequency is one.

Thus, the occurrence frequency of the keyword "ペン" and the occurrence frequency of the keyword "床" are one in the document "テーブルの上にはペンがある。そして、床の上には本がある。また、ソファの上にはクッションが見える。". However, the occurrence position of the keyword "ペン" is earlier than the occurrence position of the keyword "床", it is determined that the correlation rate of the keyword "ペン" is higher than the correlation rate of the keyword "床".

When the translated retrieved results are ranked based on the correlation rates of input keywords, ranked results corresponding to the intention of the user can be obtained.

Figure 9:
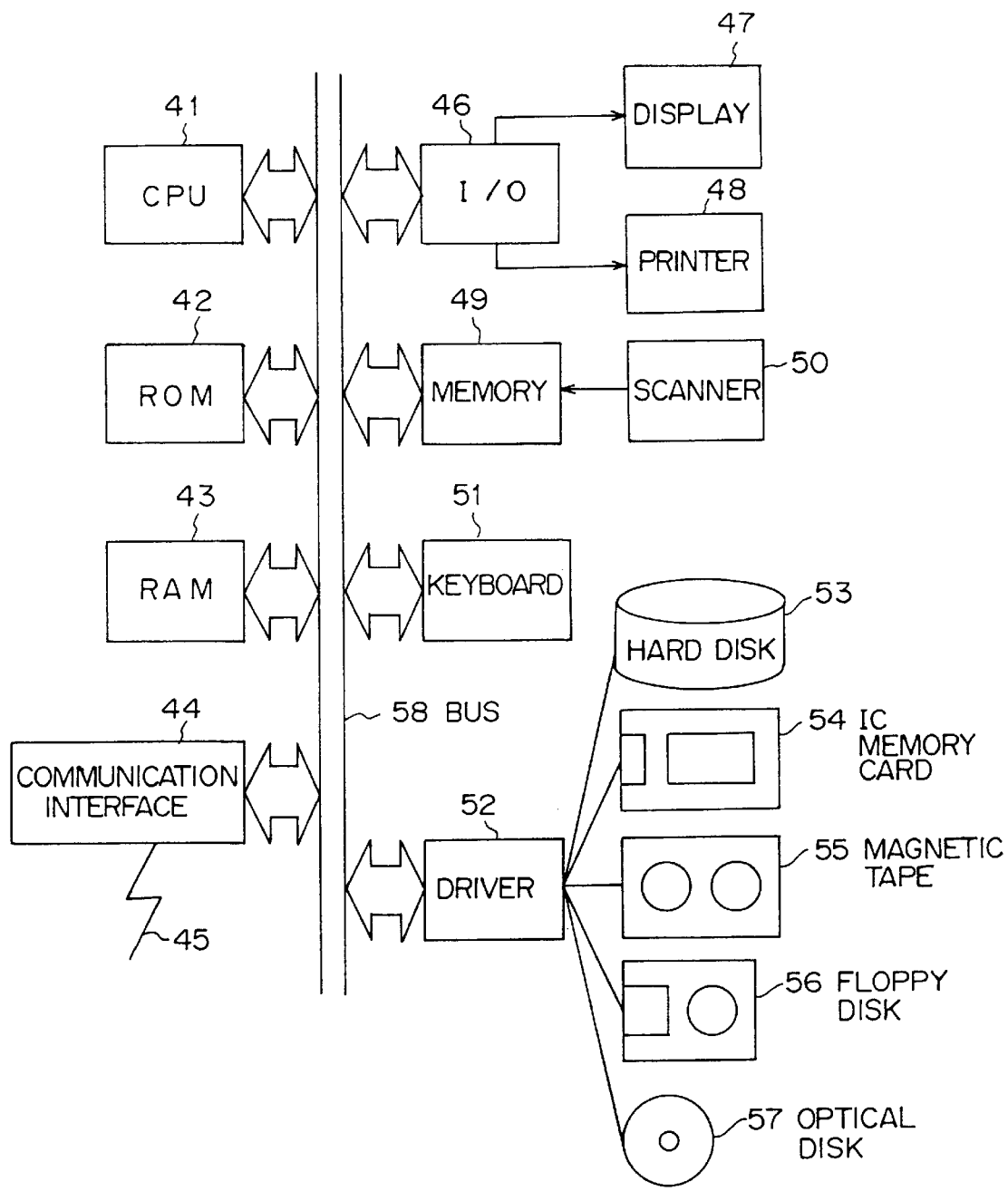
FIG. 9 is a block diagram showing the structure of an information retrieving apparatus according to an embodiment of the present invention.

FIG. 9 is a block diagram showing the structure of the information retrieving apparatus according to an embodiment of the present invention.

In FIG. 9, reference numeral 41 is a central processing unit (CPU) that performs overall processes of the system. Reference numeral 42 is a read-only memory (ROM). Reference numeral 43 is a random access memory (RAM). Reference numeral 44 is a communication interface. Reference numeral 45 is a communication network. Reference numeral 46 is an input/output interface. Reference numeral 47 is a display. Reference numeral 48 is a printer that prints texts, images, and so forth. Reference numeral 49 is a memory that temporarily stores data read by a scanner 50 that reads texts, images, and so forth. Reference numeral 51 is a keyboard. Reference numeral 52 is a driver that drives a storing medium. Reference numeral 53 is a hard disk. Reference numeral 54 is an IC memory card. Reference numeral 55 is a magnetic tape. Reference numeral 56 is a floppy disk. Reference numeral 57 is an optical disk such as a CD-ROM or a DVD-ROM. Reference numeral 58 is a bus.

Programs that perform the information retrieving process and the format conversion process and data to be retrieved are stored in a storing medium such as the hard disk 53, the IC memory card 54, the magnetic tape 55, the floppy disk 56, and the optical disk 57. The programs for performing the information retrieving process and the format conversion process are read from such a storing medium to the RAM 43 so as to execute the information retrieving process through the format conversion process. Alternatively, programs for performing the information retrieving process and the format conversion process and data to be retrieved may be stored in the ROM 42.

An another alternative structure, such programs and such data may be obtained from the communication network 45 through the communication interface 54. Examples of the communication network 45 connected through the communication interface 44 are a LAN (Local Area Network), a WAN (Wide Area Network), the Internet, an analog telephone network, a digital telephone network (ISDN: Integrated Services Digital Network), a radio telephone network, for example, PHS (Personal Handy-phone System) and a satellite communications network.

When the program for performing the information retrieving process is activated, the CPU 41 retrieves data based on key information that is input from the keyboard 51 and the key information read by the scanner 50. When the data format of the key information that is input is different from the data format of the data to be retrieved, the program for performing the format conversion process is activated. Thus, the data format of the input key information is matched to the data format of the data to be retrieved. After the data retrieving process has been completed, the data format of the data that has been retrieved is matched to the data format of the input key information. The resultant retrieved data is arranged. The arranged results of the retrieved data are output to the display 47 and/or the printer 48.

Next, in the case that a retrieval request described in Japanese is input and documents described in English are stored in a database, an information retrieving process according to an embodiment of the present invention will be described.

FIGS. 10A, 10B, 10C, 11A, and 11B are schematic diagrams showing an information retrieving process according to the first embodiment of the present invention. In the first embodiment, an input keyword described in Japanese is expanded into synonyms. Based on the expanded results, the retrieved results are ranked.

Figure 10A:
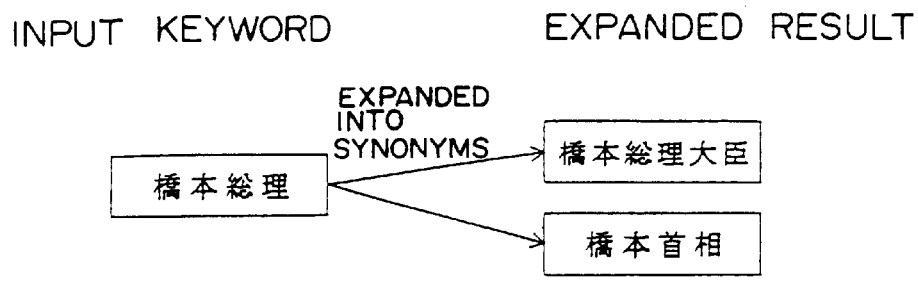
FIG. 10A is a schematic diagram showing results of a synonym expanding process according to the first embodiment of the present invention.

FIG. 10A is a schematic diagram showing expanded results as synonyms according to the first embodiment of the present invention.

In FIG. 10A, it is assumed that a keyword "橋本総理大臣 型 (Prime Minister Hashimoto)" is input as a retrieval request. By expanding the input keyword into synonyms with a synonym dictionary, synonyms "橋本総理大臣 (a synonym of Prime Minister Hashimoto)" and "橋本首相 (another synonym of Prime Minister Hashimoto)" are obtained. The expanded results are described in Japanese. By retrieving data from a Japanese-English dictionary, the expanded results of the input keyword are translated from Japanese into English.

Figure 10B:
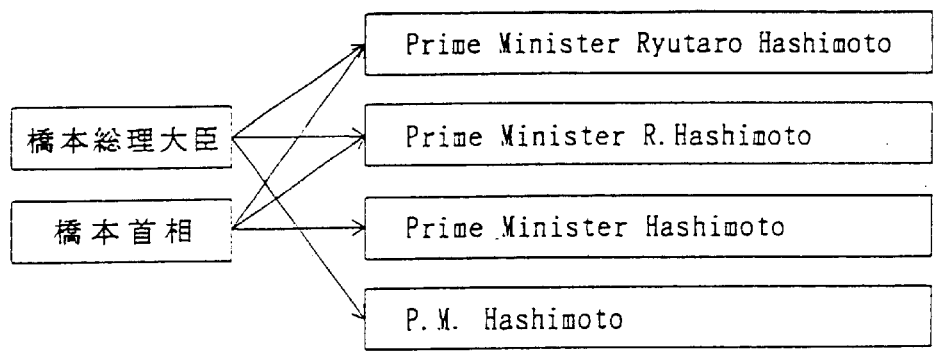
FIG. 10B is a schematic diagram showing results retrieved from a Japanese-English dictionary according to the first embodiment of the present invention.

FIG. 10B is a schematic diagram showing retrieved results of the Japanese-English dictionary according to the first embodiment of the present invention.

In FIG. 10B, by retrieving data from the Japanese-English dictionary corresponding to the expanded results, English keywords corresponding to "橋本総理大臣" are obtained as "Prime Minister Ryutaro Hashimoto", "Prime Minister R. Hashimoto", and "P. M. Hashimoto". In addition, keywords corresponding to "橋本首相" are obtained as "Prime Minister Ryutaro Hashimoto", "Prime Minister R. Hashimoto", and "Prime Minister Hashimoto". Using such keywords described in English, data is retrieved from the database described in English.

Figure 10C:
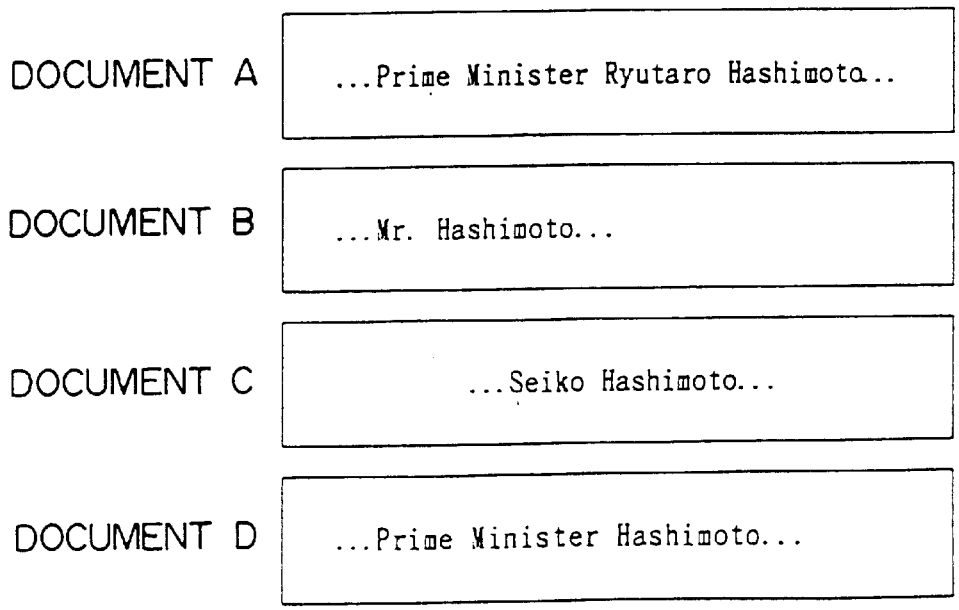
FIG. 10C is a schematic diagram showing retrieved results of documents described in English according to the first embodiment of the present invention.

FIG. 10C is a schematic diagram showing retrieved results described in English.

In FIG. 10C, using the keywords retrieved from the Japanese-English dictionary (namely, the keywords described in English), documents A to D are retrieved from the database described in English. The document A contains a character string "Prime Minister Ryutaro Hashimoto". The document B contains a character string "Mr. Hashimoto". The document C contains a character string "Seiko Hashimoto". The document D contains a character string "Prime Minister Hashimoto". When the documents A to D are retrieved from the database, they are translated from English into Japanese.

FIG. 11A is a schematic diagram showing results translated from Japanese into English according to the first embodiment of the present invention.

In FIG. 11A, when the document A is translated from English into Japanese, a document A' containing a character string "橋本首相 (Prime Minister Hashimoto)" is obtained. When the document B is translated from English into Japanese, a document B' containing a character string "橋本氏 (Mr. Hashimoto)" is obtained. When the document C is translated from English into Japanese, a document C' containing a character string "橋本聖子 (Seiko Hashimoto)" is obtained. When the document D is translated from English into Japanese, a document D' containing a character string "橋本首相 (Prime Minister Hashimoto)" is obtained. When the documents A' to D' described in Japanese are obtained, the character strings "橋本総理大臣" and "橋本首相" obtained in the synonym expanding process are compared with the documents A' to D'. By determining the correlation rates of the character string "橋本総理大臣" or "橋本首相" with the documents A' to D', the documents A' to D' are ranked.

FIG. 11B is a schematic diagram showing ranked results according to the first embodiment of the present invention.

In FIG. 11B, the document A' and the document D' each contain a character string "橋本首相". In addition, the character string 橋本首相 contained in the document A' and the document D' matches the character string "橋本首相" obtained by the synonym expanding process, these documents are highly ranked. The character string "橋本首相" contained in the document A' is present at an earlier position thereof, the document A' is more highly ranked than the document D'. In addition, the document B' contains a character string "橋本氏" and the character string "橋本氏" is similar to the character string "橋本首相" which is obtained by a synonym expanding process, the document B' is relatively highly ranked. The document C' contains the character string "橋本聖子" and the character string "橋本聖子" contains an extra character string "聖子", the document C' is lowly ranked.

Thus, the documents A', D', B', and C' are ranked in that order. Thus, the ranked results close to the intention of the user can be obtained.

FIGS. 12A, 12B, 12C, 13A, and 13B are schematic diagrams showing a practical example of an information retrieving process according to the second embodiment of the present invention. In the second embodiment, keywords are extracted from an input character string described in Japanese. Retrieved results are ranked based on results of a logical operation for extracted keywords.

FIG. 12A is a schematic diagram showing extracted results of keywords according to the second embodiment of the present invention.

In FIG. 12A, it is assumed that a character string "ソフトの開発 (development of software)" has been input as a retrieval request. By analyzing morphological elements of the character string, a keyword "ソフト (a synonym of software)" and a keyword "開発 (development)" are extracted from the character string. By extracting data from a Japanese-English dictionary corresponding to the extracted results, the keywords are converted from Japanese into English.

FIG. 12B is a schematic diagram showing results retrieved from the Japanese-English dictionary according to the second embodiment of the present invention.

In FIG. 12B, by converting a Japanese keyword "ソフト" from Japanese into English, an English keyword "soft" and an English keyword "software" are obtained. By converting a Japanese keyword "開発" from Japanese into English, an English keyword "develop" and an English keyword "development" are obtained. Retrieval expressions are generated using these keywords described in English. Data is retrieved from a database based on the retrieval expressions.

Figure 12C:
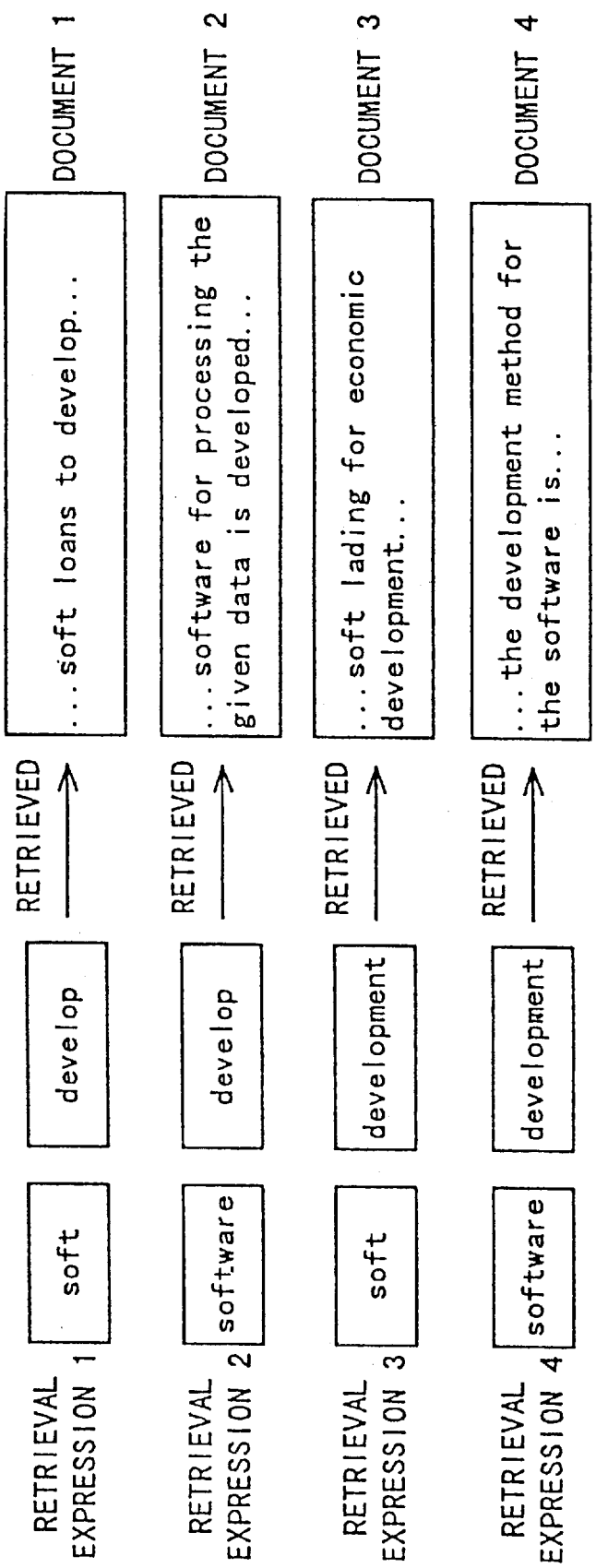
FIG. 12C is a schematic diagram showing retrieved results of documents described in English according to the second embodiment of the present invention.

FIG. 12C is a schematic diagram showing retrieved results of documents described in English according to the second embodiment of the present invention.

In FIG. 12C, with a combination of the keyword "soft" and the keyword "develop", a retrieval expression 1 "soft" "development" is generated. With a combination of the keyword "software" and the keyword "develop", a retrieval expression 2 "software" "develop" is generated. With a combination of the keyword "soft" and the keyword "development", a retrieval expression 3 "soft" "development" is generated. With a combination of the keyword "software" and the keyword "development", a retrieval expression 4 "software" "development" is generated.

Using the retrieval expressions 1 to 4, documents 1 to 4 are retrieved from a database described in English, respectively. The document 1 contains a character string "soft loans to develop". The document 2 contains a character string "software for processing the given data is developed". The document 3 contains a character string "soft landing economic development". The document 4 contains a character string "the development method for the software is". After the documents 1 to 4 have been retrieved from the database, they are translated from English into Japanese.

Corresponding to the retrieval expression 1, a plurality of documents are retrieved from the database. The document 1 contains a character string most similar to the retrieval expression 1 in the retrieved documents. The document 2 contains a character string most similar to the retrieval expression 2 in the retrieved documents which are retrieved using the retrieval expression 2. The document 3 contains a character string most similar to the retrieval expression 3 in the retrieved documents which are retrieved using the retrieval expression 3. The document 4 contains a character string most similar to the retrieval expression 4 in the retrieved documents which are retrieved using the retrieval expression 4.

When a plurality of documents are retrieved from the database corresponding to each of the retrieval expressions 1 to 4, the retrieved documents are ranked in English. By narrowing the scope of documents to be converted into Japanese, the load of the conversion process can be alleviated.

In this stage, the similarity of the retrieved results to each of the retrieval expressions 1 to 4 can be determined by ranking the retrieved results. However, there is no means for ranking the documents 1 to 4.

Figure 13A:
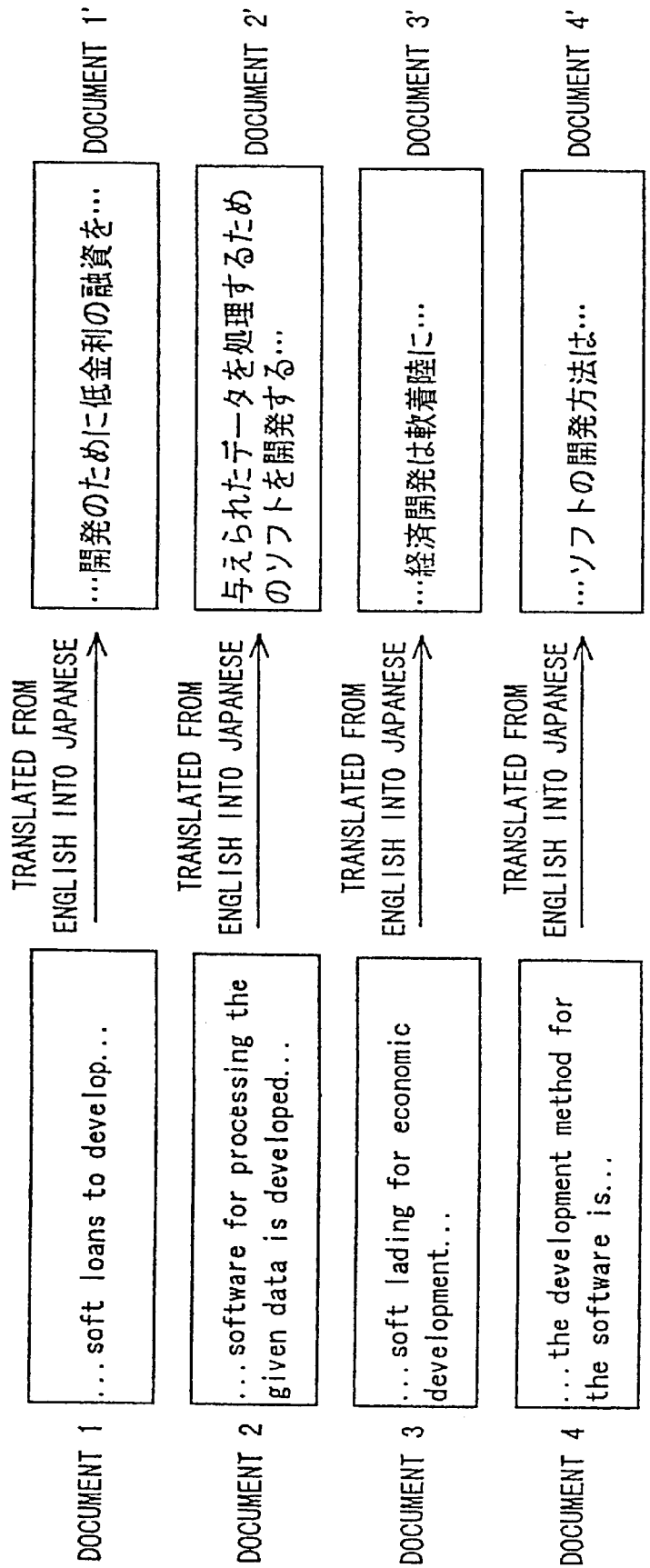
FIG. 13A is a schematic diagram showing results translated from English into Japanese according to the second embodiment of the present invention.

FIG. 13A is a schematic diagram showing results translated from English into Japanese according to the second embodiment of the present invention.

In FIG. 13A, by translating the document 1 from English into Japanese, a document 1' containing a character string "開発のために低い金利の融資を (soft loans to develop)" is obtained. By translating the document 2 from English into Japanese, a document 2' containing a character string "与えられたデータを処理するためのソフトを開発する (software for processing the given data is developed)" is obtained. By translating the document 3 from English into Japanese, a document 3' containing a character string "経済開発は軟着陸に (soft landing economic development)" is obtained. By translating the document 4 from English into Japanese, a document 4' containing a character string "ソフトの開発方法は (the development method for the software is)" is obtained. When the documents 1' to 4' described in Japanese are obtained, the character string "ソフトの開発" that is input as the retrieval request is compared with the documents 1' to 4'. By determining the correlation rates of the character string "ソフトの開発" and the documents 1' to 4', the documents 1' to 4' are ranked.

Figure 13B:
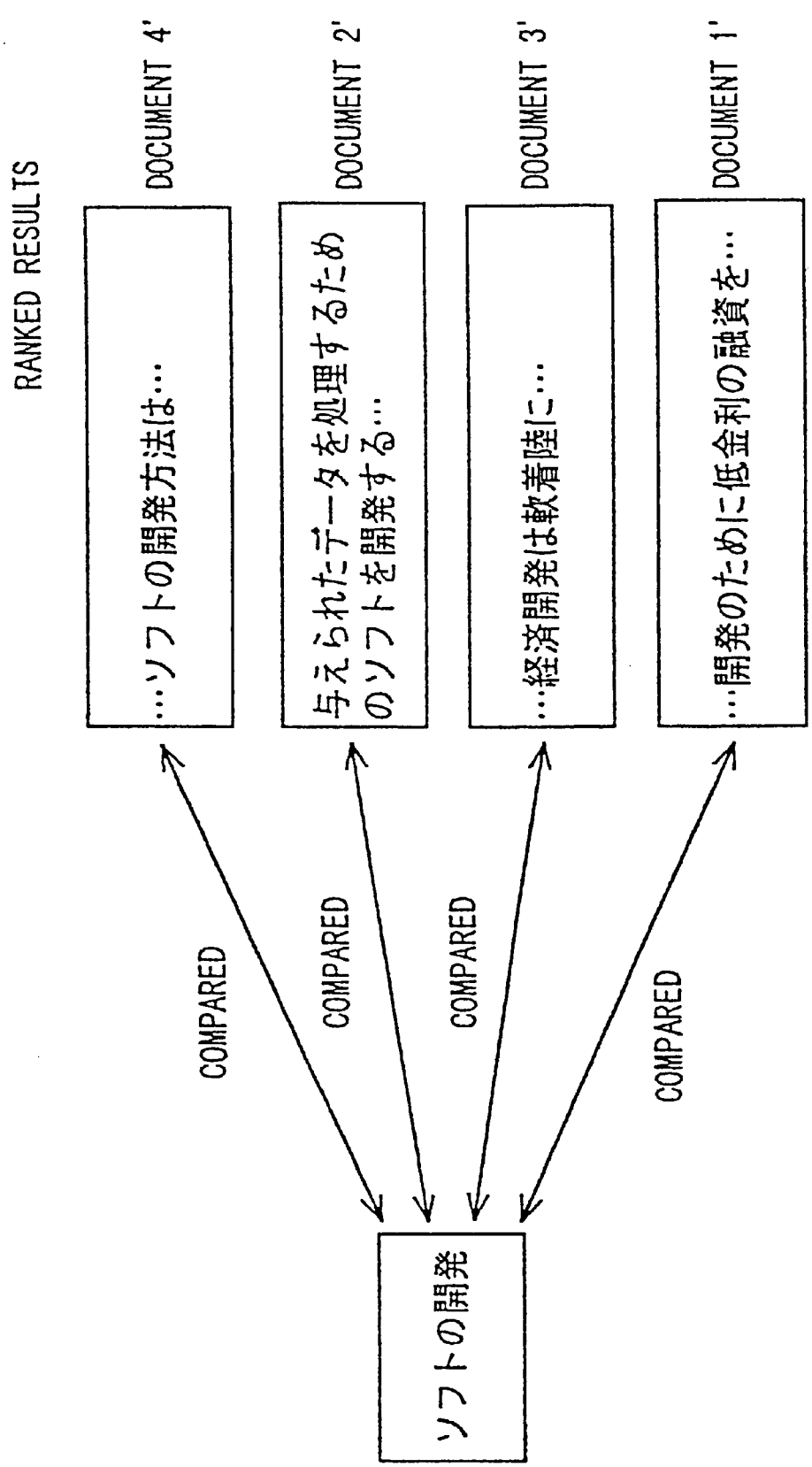
FIG. 13B is a schematic diagram showing ranked results according to the second embodiment of the present invention.

FIG. 13B is a schematic diagram showing ranked result according to the second embodiment of the present invention.

In FIG. 13B, the document 4' contains a character string "ソフトの開発". The character string "ソフトの開発" contained in the document 4' matches the character string "ソフトの開発" that is input as the retrieval request. Thus, the document 4' is highly ranked. The document 2' contains a character string "ソフトを開発". The character string "ソフトを開発" contained in the document 2' similar to the character string "ソフトの開発" that is input as the retrieval request. Thus, the document 2' is relatively highly ranked. Although the document 3' and the document 1' each contain a character string "開発" since these documents do not contain a character string "ソフト", the documents 3' and 1' are lowly ranked.

Thus, the documents 4', 2', 3', and 1' are highly ranked in the order thereof. Thus, the ranked results close to the intention of the user can be obtained.

FIGS. 14A, 14B, 15, 16, and 17 are schematic diagrams showing a practical example of an information retrieving process according to a third embodiment of the present invention. In the information retrieving process according to the third embodiment, keywords are extracted from an input character string described in Japanese. Corresponding to synonyms as expanded results of the extracted keywords, retrieved results are ranked.

Figure 14A:
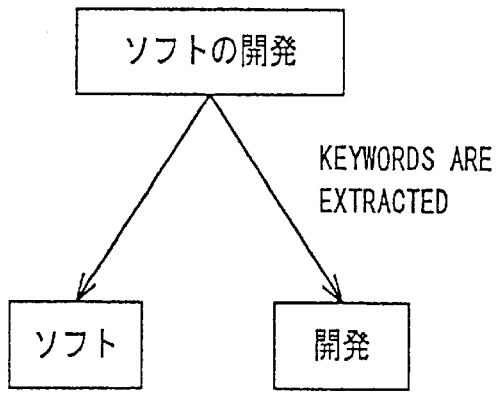
FIG. 14A is a schematic diagram showing extracted results of keywords according to a third embodiment of the present invention.

FIG. 14A is a schematic diagram showing extracted results of keywords according to the third embodiment of the present invention.

In FIG. 14A, a character string "ソフトの開発 (development of software)" is input as a retrieval request. By analyzing morphological elements of the character string "ソフトの開発", a keyword "ソフト (software)" and a keyword "開発 (development)" are extracted. The extracted results are expanded into synonyms. Data is retrieved from a Japanese-English dictionary corresponding to the synonyms. Thus, the keywords are converted from Japanese into English.

Figure 14B:
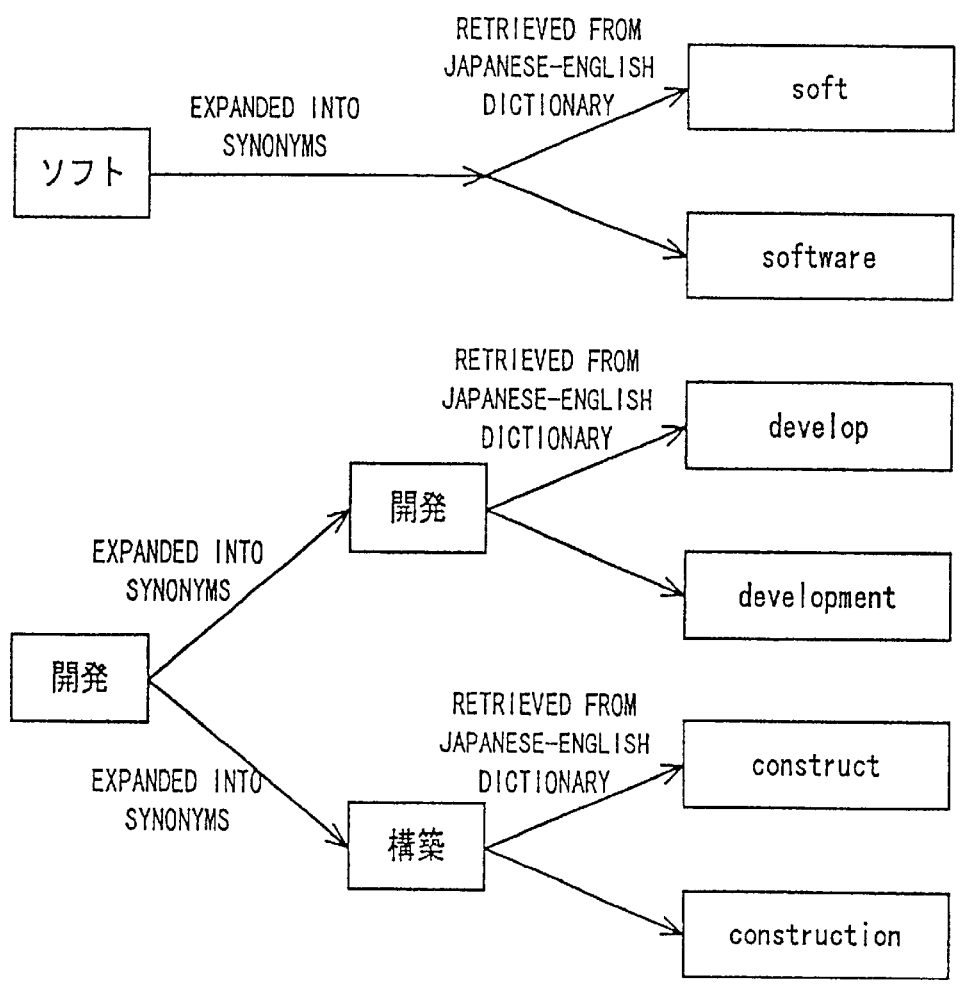
FIG. 14B is a schematic diagram showing synonyms as expanded results and results retrieved from a Japanese-English dictionary according to the third embodiment of the present invention.

FIG. 14B is a schematic diagram showing synonyms as expanded results and results retrieved from the Japanese-English dictionary according to the third embodiment of the present invention.

In FIG. 14B, it is assumed that when the Japanese keyword "ソフト" is expanded, no synonym is obtained. By converting the keyword "ソフト" from Japanese into English, an English keyword "soft" and an English keyword "software" are obtained.

On the other hand, when the synonyms of the Japanese keyword "開発" are developed in Japanese, a keyword "開発" and a keyword "構築 (construction)" are obtained as synonyms. By converting the keyword "開発" from Japanese into English, an English keyword "develop" and an English keyword "development" are obtained. By converting the keyword "構築" from Japanese into English, an English keyword "construct" and an English keyword "construction" are obtained. Using these keywords described in English, retrieval expressions are generated. Based on the retrieval expressions, data is retrieved from the database.

By expanding keywords into synonyms, data can be retrieved in a wide retrieval range. By arranging retrieved results in a wide range, the total accuracy of the retrieving process can be improved.

Figure 15:
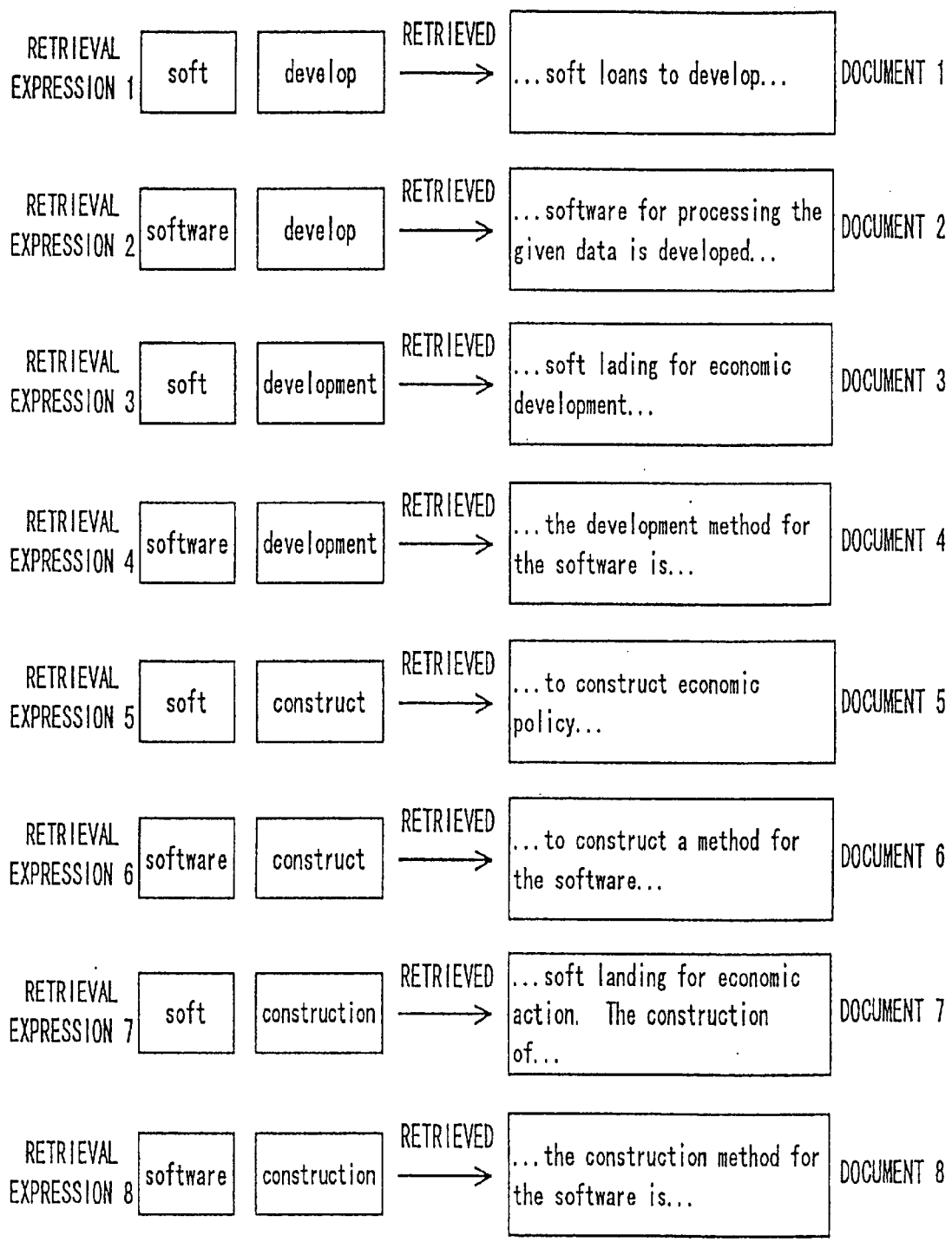
FIG. 15 is a schematic diagram showing retrieved results of documents described in English according to the third embodiment of the present invention.

FIG. 15 is a schematic diagram showing retrieved results of documents described in English according to the third embodiment of the present invention.

In FIG. 15, with a combination of a keyword "soft" and a keyword "develop", a retrieval expression 1 "soft" "develop" is generated. With a combination of a keyword "software" and the keyword "develop", a retrieving expression 2 "software" "develop" is generated. With a combination of the keyword "soft" and a keyword "development", a retrieval expression 3 "soft" "development" is generated. With a combination of the keyword "software" and a keyword "development", a retrieval expression 4 "software" "development" is generated.

With a combination of the keyword "soft" and a keyword "construct", a retrieval expression 5 "soft" "construct" is generated. With a combination of the keyword "software" and the keyword "construct", a retrieval expression 6 "software" "construct" is generated. With a combination of the keyword "soft" and a keyword "construction", a retrieval expression 7 "soft" "construction" is generated. With a combination of the keyword "software" and the keyword "construction", a retrieval expression 8 "software" "construction" is generated.

Using the retrieval expressions 1 to 8, documents 1 to 8 described in English are retrieved from the database. The document 1 contains a character string "soft loans to develop". The document 2 contains a character string "software for processing the given data is developed". The document 3 contains a character string "soft landing economic development". The document 4 contains a character string "the development method for the software is". The document 5 contains a character string "to construct economic policy". The document 6 contains a character string "to construct a method for the software". The document 7 contains a character string "soft landing for economic action. The construction of". The document 8 contains a character string "the construction method for the software is". After the documents 1 to 8 have been retrieved, they are translated from English into Japanese.

Figure 16:
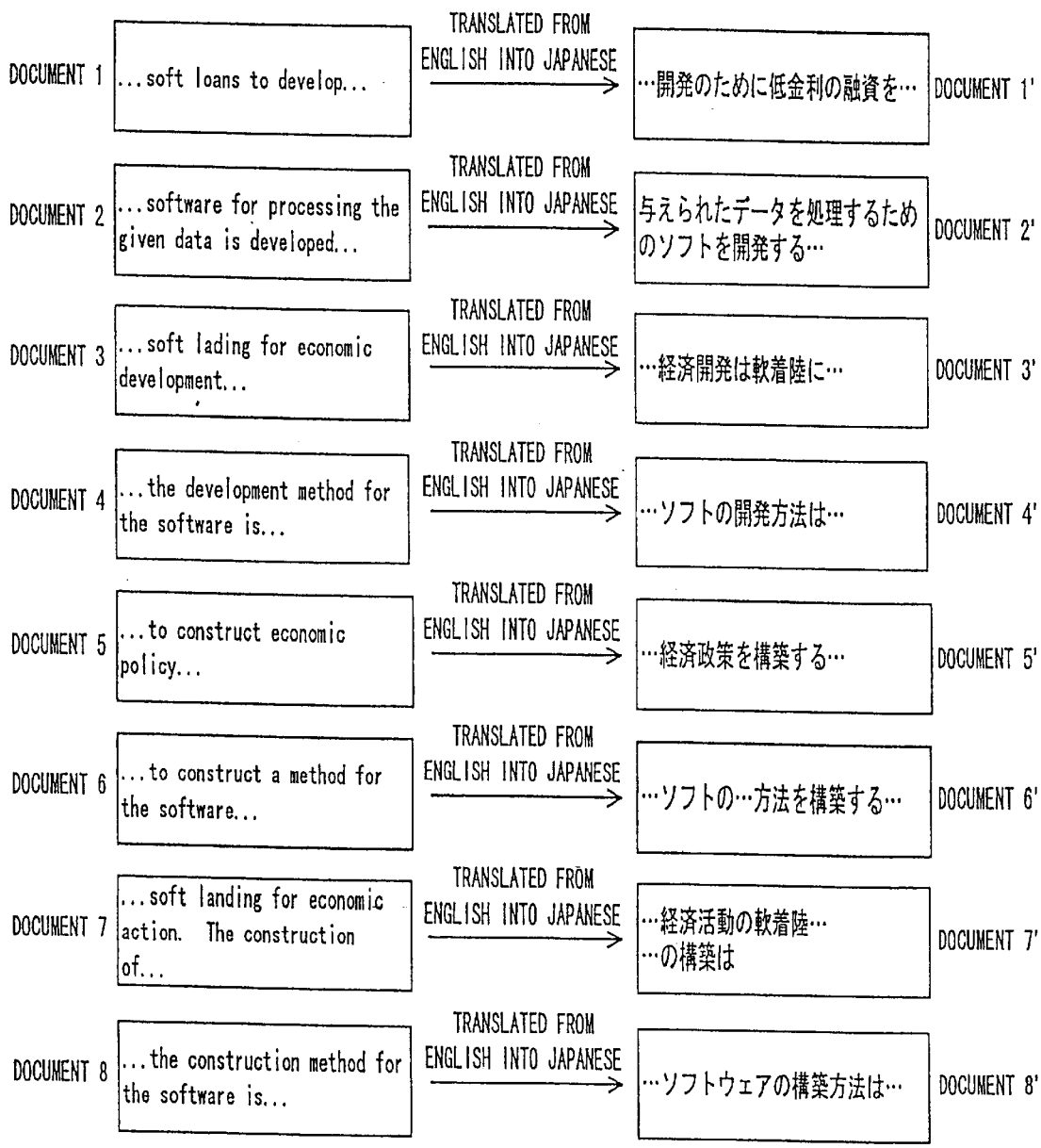
FIG. 16 is a schematic diagram showing results translated from English into Japanese according to the third embodiment of the present invention.

FIG. 16 is a schematic diagram showing results translated from English into Japanese according to the third embodiment of the present invention.

In FIG. 16, by translating the document 1 from English into Japanese, a document 1' containing a character string "開発のために低い金利の融資を" is obtained. By translating the document 2 from English into Japanese, a document 2' containing a character string "与えられたデータを処理するためのソフトを開発する" is obtained. By translating the document 3 from English into Japanese, a document 3' containing a character string "経済開発は軟着陸に" is obtained. By translating the document 4 from English into Japanese, a document 4' containing a character string "ソフトの開発方法は" is obtained. By translating the document 5 from English into Japanese, a document 5' containing a character string "経済政策を構築する" is obtained. By translating the document 6 from English into Japanese, a document 6' containing a character string "ソフトの...方法を構築する" is obtained. By translating the document 7 from English into Japanese, a document 7' containing a character string "経済活動の軟着陸...の構築は" is obtained. By translating the document 8 from English into Japanese, a document 8' containing a character string "ソフトウエアの構築方法は" is obtained. Thereafter, the character string "ソフトの開発" that has been input as a retrieval request and the character string "ソフトの構築" that has been obtained as a synonym expanded from the input retrieval request are compared with the documents 1' to 8'. By determining the correlation rates of the character string "ソフトの開発" or the character string "ソフトの構築" and the documents 1' to 8', the documents 1' to 8' are ranked.

Figure 17:
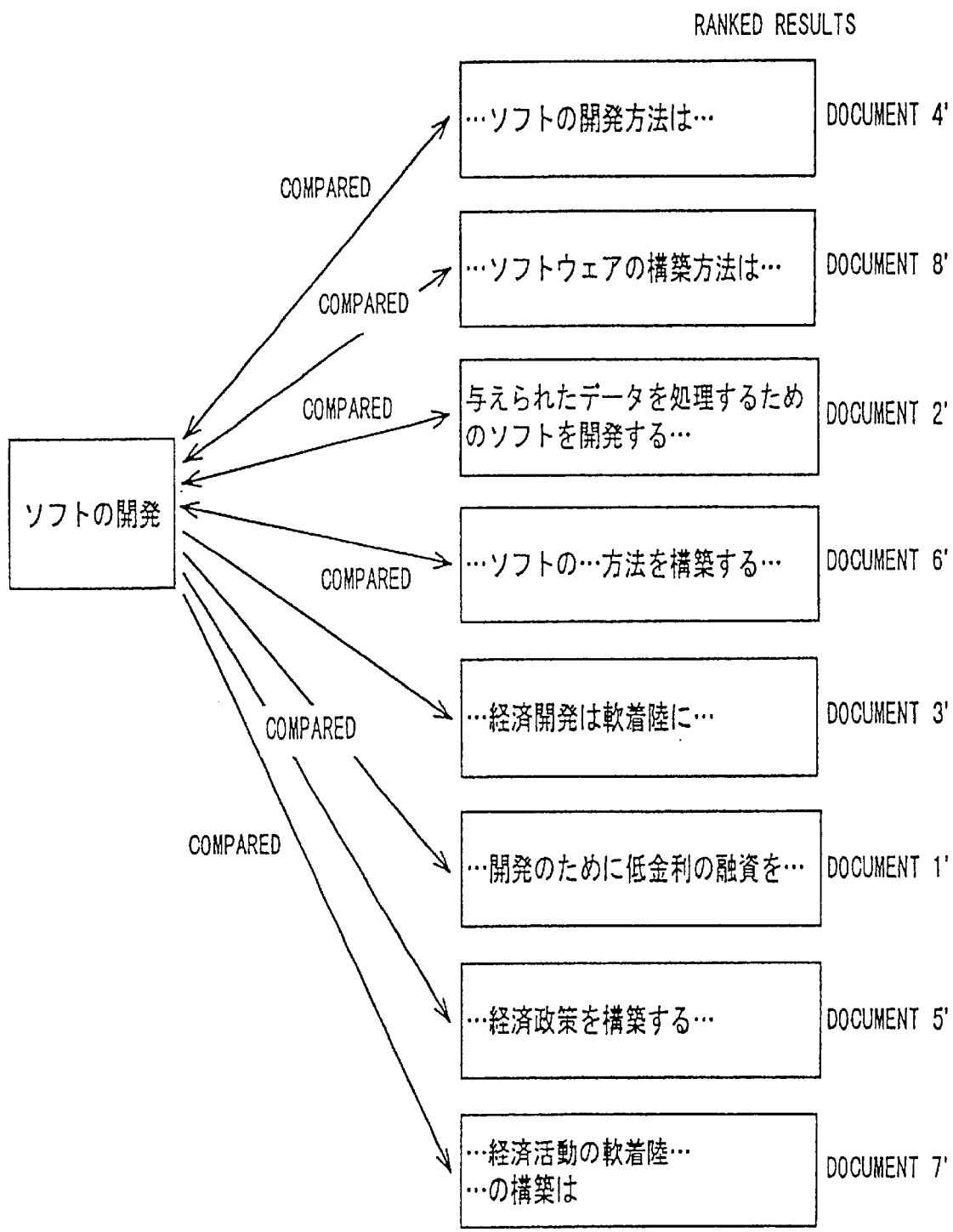
FIG. 17 is a schematic diagram showing ranked results according to the third embodiment of the present invention.

FIG. 17 is a schematic diagram showing ranked results according to the third embodiment of the present invention.

In FIG. 17, the document 4' contains the character string "ソフトの開発". Since the character string "ソフトの開発" matches the character string "ソフトの開発" that has been input as the retrieval request, the document 4' is highly ranked. The document 8' contains the character string "ソフトウエアの構築". Since the character string "ソフトウエアの構築" almost matches the character string "ソフトの構築" that has been obtained as a synonym expanded from the retrieval request, the document 8' is highly ranked.

The document 2' contains the character string "ソフトを開発". Since the character string "ソフトを開発" is similar to the character string "ソフトの開発" that has been input as the retrieval request, the document 2' is relatively highly ranked. The document 6' contains the character string "ソフト" and the character string "構築". The character string "ソフト" and the character string "構築" match the keywords contained in the character string "ソフトの構築" that has been obtained as a synonym expanded from the retrieval request, the document 6' is relatively highly ranked.

Although the document 3' and the document 1' each contain a character string "開発", since they do not contain the character string "ソフト", they are relatively lowly ranked.

Although the document 5' and the document 7' each contain a character string "構築", since they do not contain the character string "ソフト", they are lowly ranked.

Thus, the document 4', the document 8', the document 2', the document 6', the document 3', the document 1', the document 5', and the document 7' are ranked in the order thereof. Consequently, the ranked results close to the intention of the user can be obtained in a wide retrieval range.

Next, an arranging method for translated results of retrieved results according to an embodiment of the present invention will be described more practically.

FIGS. 18A and 18B are schematic diagrams for explaining an arranging method for translated results of retrieved results according to the first embodiment of the present invention.

In FIG. 18A, document 1' to document 4' are obtained as translated results of retrieved results corresponding to a keyword "ソフト" and a keyword 開発. The document 1 contains a character string "開発のために低い金利の融資を". The document 2' contains a character string "与えられたデータを処理するためのソフトを開発する". The document 3' contains a character string "経済開発は軟着陸に". The document 4' contains a character string "ソフトの開発方法は".

Using the keyword "ソフト" and the keyword "開発", a logical integration operation for the document 1' to the document 4' is performed. In other words, only documents containing both the keyword "ソフト" and the keyword "開発" are extracted and the extracted documents are output as arranged results.

Thus, as shown in FIG. 18B, the document 2' and the document 4' that contain both the keyword "ソフト" and the keyword "開発" are output as arranged results. In this embodiment, since retrieved documents are not ranked, although they correlate with each other, they are not ranked corresponding to the correlation rates.

Figure 19:
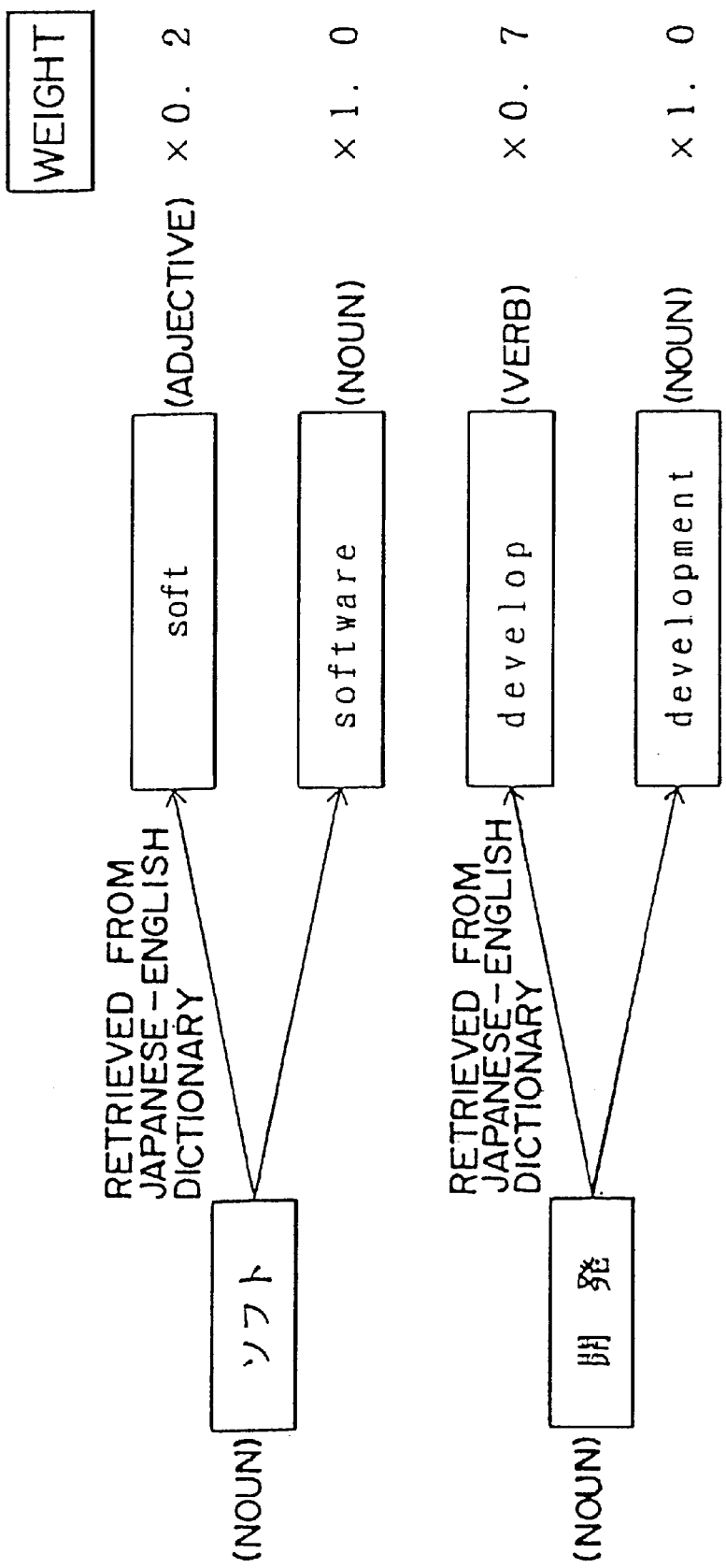
FIG. 19 is a schematic diagram for explaining an arranging method for translated results of retrieved results according to the second embodiment of the present invention.

FIG. 19 is a schematic diagram for explaining an arranging method for translated results of retrieved results according to the second embodiment of the present invention.

In FIG. 19, a character string "ソフトの開発" is input as a retrieval request. By analyzing morphological elements of the character string "ソフトの開発", a keyword "ソフト" and a keyword "開発" are extracted. Since the input character string is "ソフトの開発", it is clear that the keyword "ソフト" and the keyword "開発" are noun.

On the other hand, by performing the conversion from Japanese into English for "ソフト" a character string "soft" and a character string "software" are obtained as results. The converted result "soft" of the keyword "ソフト" is an adjective. The converted result "software" of the keyword "ソフト" is a noun. Since the part of speech of the keyword "ソフト" matches the part of speech of the converted result "software", the converted result "software" is assigned a high weight. On the other hand, since the part of speech of the keyword "ソフト" does not match the part of speech of the converted result "soft", the converted result "soft" is assigned a low weight. In this embodiment, the converted result "soft" is assigned, for example, a weight of 0.2. The converted result "software" is assigned, for example, a weight of 1.0.

Likewise, by performing the conversion from Japanese into English for "開発", a character string "develop" and a character string "development" are obtained as results. The converted result "develop" of the keyword "開発" is a verb. The converted result "development" of the keyword "開発" is a noun. Since the part of speech of the keyword "開発" matches the part of speech of the converted result "development", the converted result "development" is assigned a high weight. Since the part of speech of the keyword "開発" does not match the part of speech of the converted result "develop", the converted result "develop" is assigned a low weight. In this embodiment, the converted result "develop" is assigned, for example, a weight of 0.7. The converted result "expansion" is assigned, for example, a weight of 1.0.

When retrieved results are finally ranked using these obtained weight values, arranged results can be obtained with high reliability.

Figure 20:
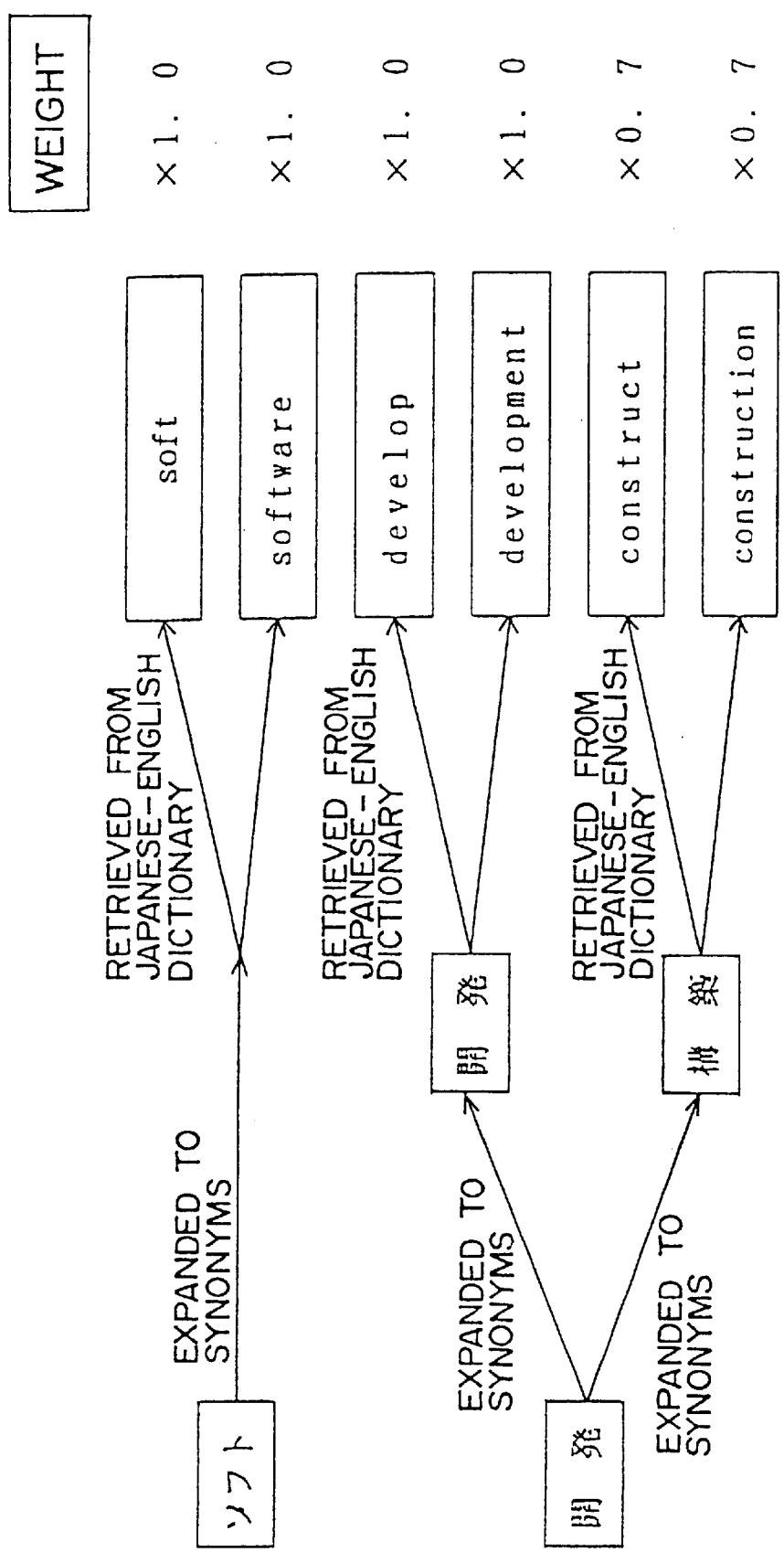
FIG. 20 is a schematic diagram for explaining an arranging method for translated results of retrieved results according to the third embodiment of the present invention.

FIG. 20 is a schematic diagram for explaining an arranging method for translated results of retrieved results according to the third embodiment of the present invention.

In FIG. 20, a character string "ソフトの開発" is input as a retrieval request. By analyzing morphological elements of the character string "ソフトの開発", a keyword "ソフト" and a keyword "開発" are extracted. It is assumed that when the synonym expanding process is performed for the keyword "ソフト", no synonym of the keyword "ソフト" is obtained. By converting the keyword "ソフト" from Japanese into English, a keyword "soft" and a keyword "software" are obtained.

On the other hand, It is assumed that when the synonym expanding process is performed in Japanese for the keyword "開発", a keyword "開発" and a keyword "構築" are obtained as synonyms. By converting the keyword "開発" from Japanese into English, a keyword "develop" and a keyword "development" are obtained. By converting the keyword "構築" from Japanese into English, a keyword "construct" and a keyword "construction" are obtained.

By retrieving documents from the database using to such keywords, documents containing the keyword "ソフト" and the keyword "構築" are obtained as translated results of the retrieved results. In addition, documents are retrieved from the database using synonyms expanded from keywords. Thus, documents containing the keyword "ソフト" and the keyword "構築" are obtained as translated results of retrieved results. When these documents are ranked, documents retrieved using original keywords and documents retrieved using synonyms expanded from the keywords are ranked. The documents retrieved using synonyms are lowly ranked.

The keywords "soft", "software", "develop", and "development" obtained corresponding to the original keywords are assigned, for example, a weight of 1.0. The keywords "construct" and "construction" obtained by the synonym expanding process are assigned, for example, a weight of 0.7.

Figure 21:
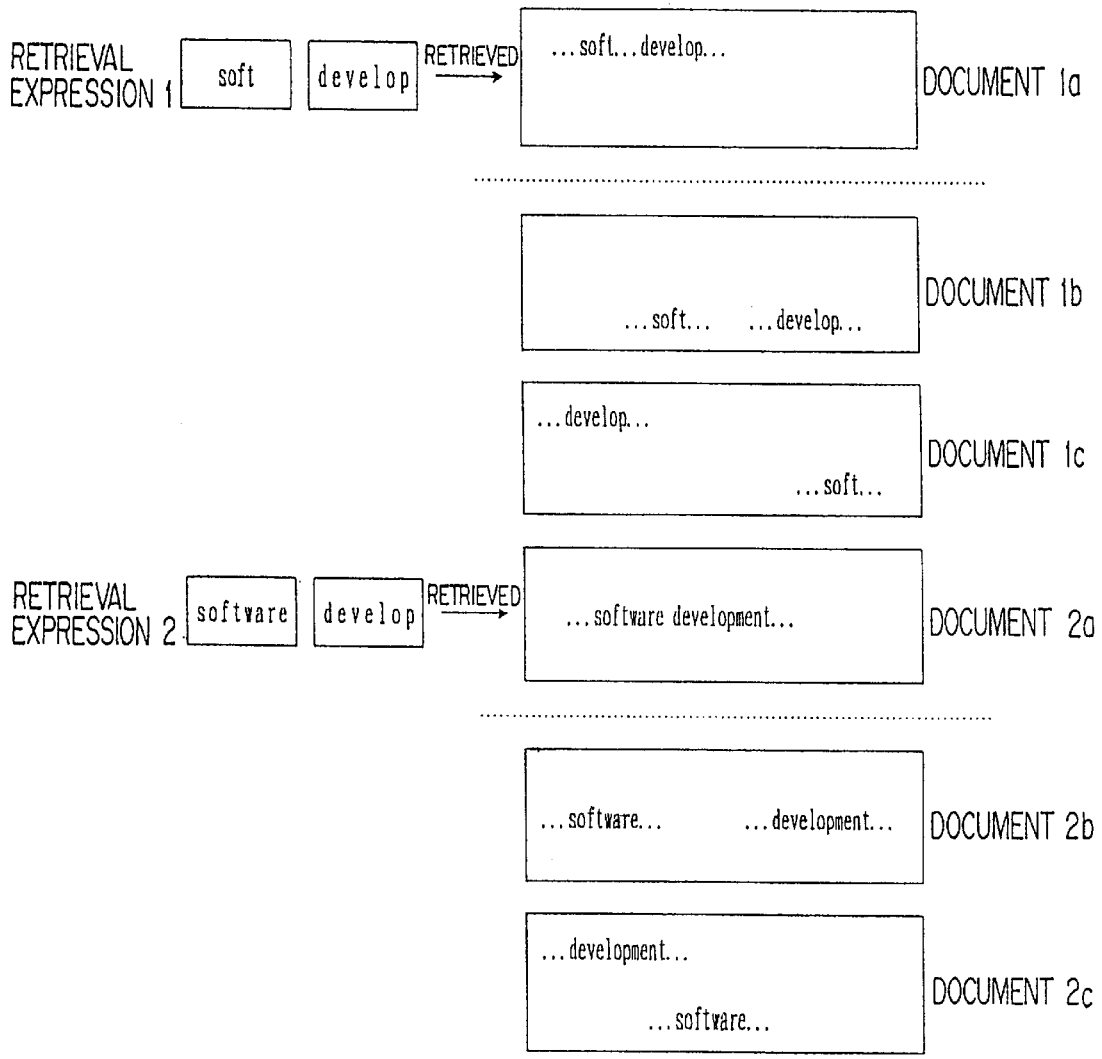
FIG. 21 is a schematic diagram for explaining an arranging method for translated results of retrieved results according to a fourth embodiment of the present invention.

FIG. 21 is a schematic diagram for explaining an arranging method for translated results of retrieved results according to a fourth embodiment of the present invention.

In FIG. 21, a character string "ソフトの開発" is input as a retrieval request. By analyzing morphological elements of the character string "ソフトの開発", a keyword "ソフト" and a keyword "開発" are extracted. By converting the keyword "ソフト" from Japanese into English, a keyword "soft" and a keyword "software" are obtained. By converting the keyword "開発" from Japanese into English, a keyword "develop" is obtained. With a combination of the keyword "soft" and the keyword "develop", a retrieval expression 1 "soft" "development" is generated. With a combination of the keyword "software" and the keyword "develop", a retrieval expression 2 "software" "development" is generated. Using the retrieval expression 1, three documents 1a to 1c containing the keywords "soft" and "develop" are retrieved. Using the retrieval expression 2, three documents 2a to 2c containing the keywords "software" and "develop" are retrieved.

When a plurality of documents 1a to 1c are retrieved, they are ranked using the keywords "soft" and "develop". Thus, when the document 1a is ranked in the highest position, only the document 1a ranked in the highest position is supplied to a unit that performs a translating process.

On the other hand, the documents 2a to 2c are ranked using the keywords "software" and "develop". When the document 2a is ranked in the highest position, only the document 2a ranked in the highest position is supplied to the unit that performs the translating process.

After the translating process for the document 1a and the document 2a has been completed, the translated results for the document 1a and the document 2a are ranked using the keywords "ソフト" and "開発" described in Japanese. The ranked results are presented to the user.

When the ranking process is performed in two stages, and the scope of the documents to be converted is narrowed and then supplied to the translating process, the processing time can be shortened.

Next, a translating method for retrieved results according to an embodiment of the present invention will be described in detail.

FIG. 22 is a schematic diagram for explaining a translating method for retrieved result according to the first embodiment of the present invention.

In FIG. 22, a character string "床" in Japanese is input. By converting the character string "床" from Japanese into English, a keyword "floor" is obtained. Using the keyword "floor", a document "There is a pen on the table. And there are books on the floor. I also see cushions on the sofa." is retrieved from a database. At this point, the occurrence position of the keyword "floor" is stored. By a sentence delimiting process, only a sentence "And there are books on the floor" containing the keyword "floor" is extracted from the retrieved document. By translating the extracted sentence from English into Japanese, a sentence "そして、床の上には本がある。" can be obtained.

The above-described processes are performed for all the retrieved documents. Thus, a group of Japanese documents containing one translated Japanese sentence are generated.

By comparing the input character string "床" with the generated group of Japanese documents, the generated documents are ranked.

Thus, the scope of documents to be translated can be minimized. Consequently, the process time can be shortened.

Figure 23:
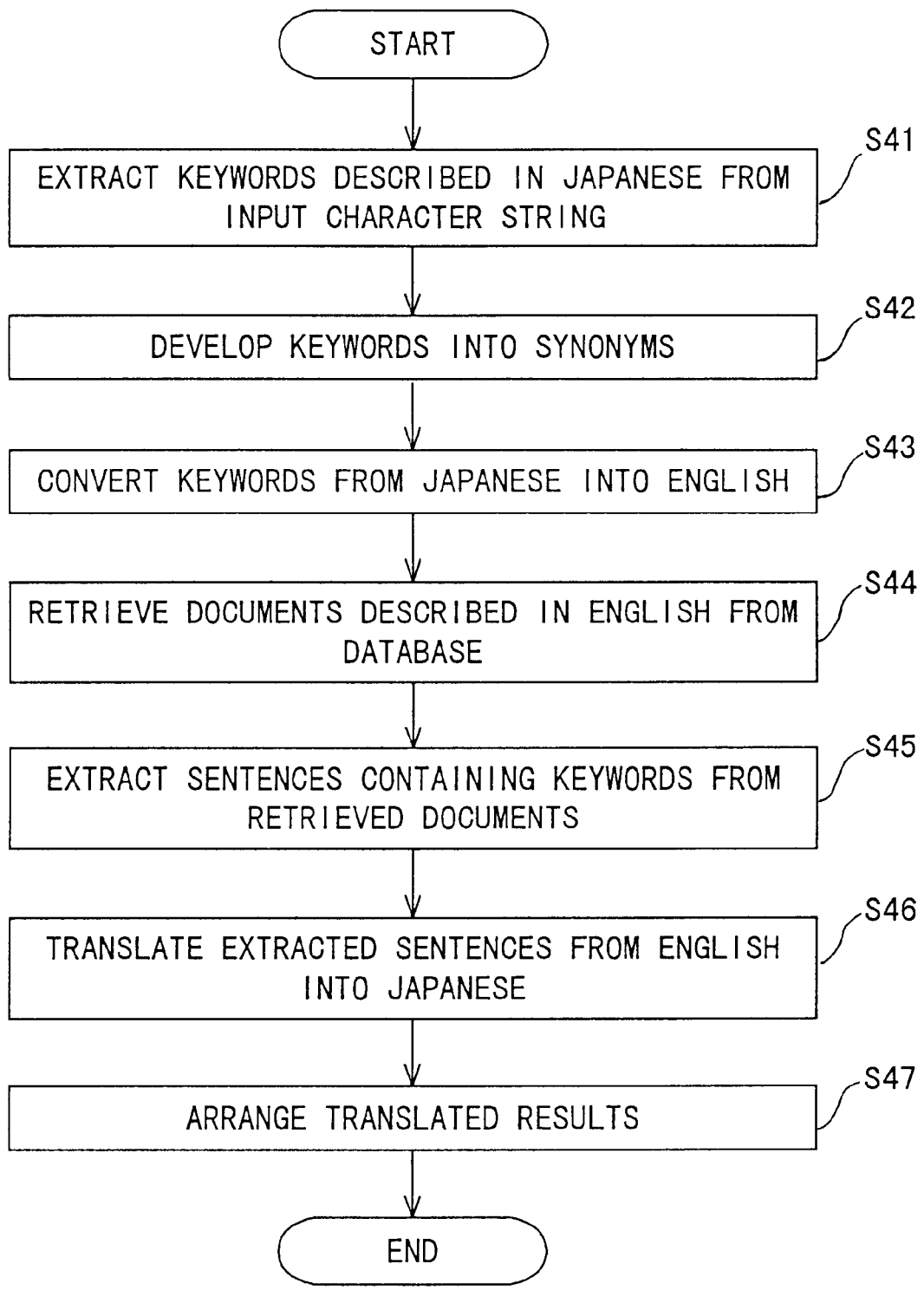
FIG. 23 is a flow chart showing the translating method for retrieved results according to the first embodiment of the present invention.

FIG. 23 is a flow chart showing the translating method for retrieved results according to the first embodiment of the present invention.

In FIG. 23, Japanese keywords are extracted from an input character string described in Japanese (at step S41).

The keywords are expanded into synonyms (at step S42).

The keywords are translated from Japanese into English (at step S43).

Using the English keywords, documents described in English are retrieved from a database described in English (at step S44).

Only sentences containing the keywords described in English are extracted from the retrieved documents (at step S45).

The extracted sentences are translated from English into Japanese (at step S46).

Using the input character string in Japanese and synonyms in Japanese expanded therefrom, the translated sentences described in Japanese are arranged (at step S47).

FIG. 24 is a schematic diagram for explaining a translating method for retrieved results according to the second embodiment of the present invention.

In FIG. 24, a character string "床" described in Japanese is input. By converting the input character string "床" from Japanese into English, a keyword "floor" is obtained. By retrieving English documents using the keyword "floor", an English document "xxxxx xxxxxxxxxx xx x xxxxx, xxxxx xxxx xx xxxxx. yyyy yy yyy yyyyy. There is a pen on the table. And there are books on the floor. I also see cushions on the sofa. aaa aaaaa aa a aaaa, aaaa aaa aaa aaaa a aaa. bb bbb bbbb." is retrieved. At this point, the occurrence position of the keyword "floor" is stored. By a sentence delimiting process, a paragraph "There is a pen on the table. And there are books on the floor. I also see cushions on the sofa." containing the keyword "floor" is extracted from the retrieved document. By translating the extracted paragraph from English into Japanese, a Japanese sentence "テーブルの上にはペンがある。そして、床の上には本がある。また、ソファの上にはクッションが見える。" can be obtained.

The above-described processes are performed for all the retrieved documents. Thus, a group of Japanese documents containing one paragraph of a sentence translated in Japanese are generated. By comparing the original input character string "床" with the group of Japanese documents, the documents are ranked.

By extracting only paragraphs containing keywords from documents translated into Japanese, the process can be performed at higher speed without a deterioration of the accuracy of the information compared with the original keywords, than in the case that only one sentence is translated. Thus, documents can be ranked at high speed with high reliability.

Figure 25:
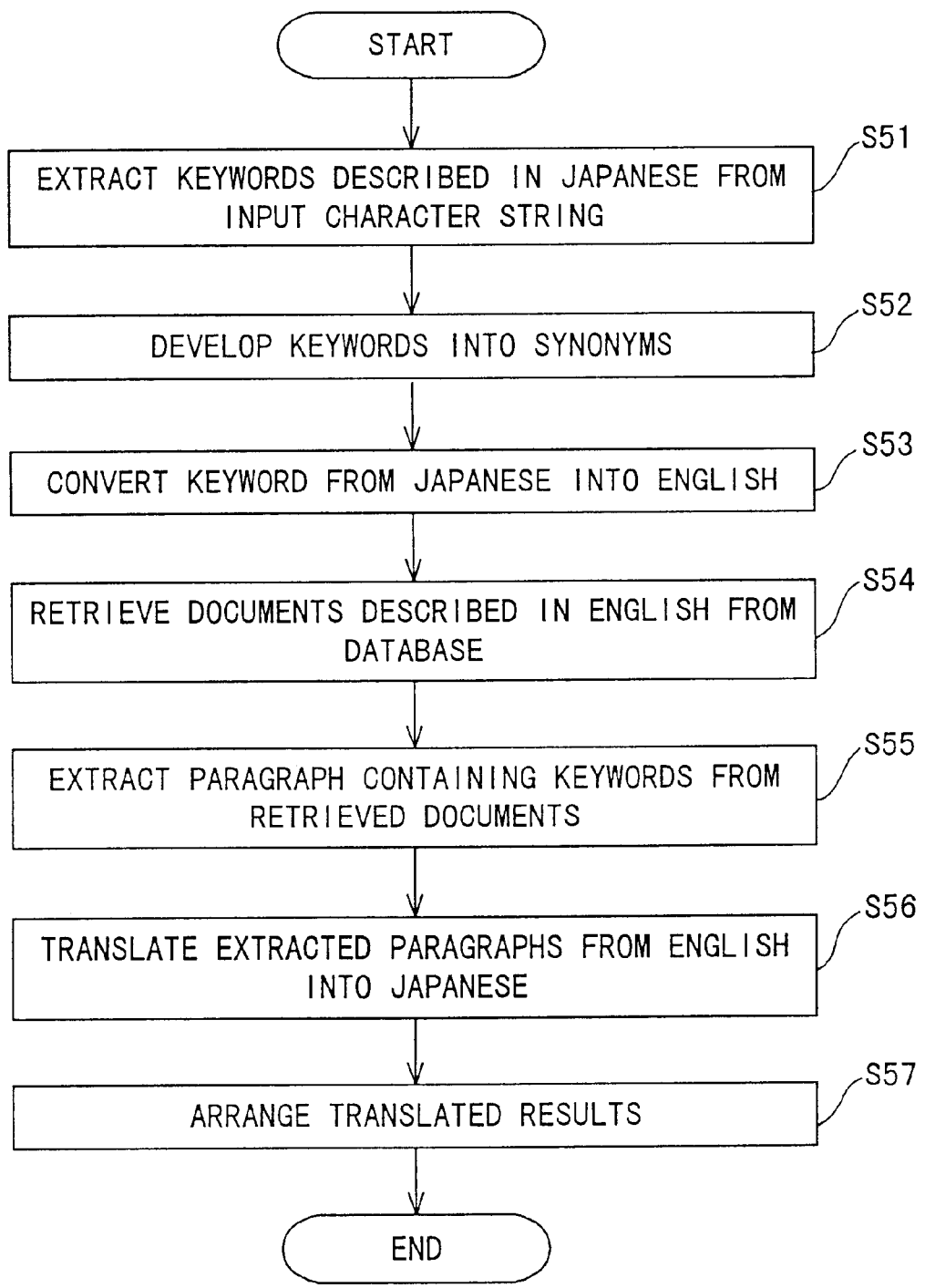
FIG. 25 is a flow chart showing the translating method for retrieved results according to the second embodiment of the present invention.

FIG. 25 is a flow chart showing a translating method for retrieved results according to the second embodiment of the present invention.

In FIG. 25, keywords described in Japanese are extracted from an input character string described in Japanese (at step S51).

The keywords described in Japanese are expanded into synonyms (at step S52).

The keywords described in Japanese are converted from Japanese into English (at step S53).

Using the keywords described in English, documents described in English are retrieved from a database described in English (at step S54).

Only paragraphs containing the keywords described in English are extracted from the retrieved documents described in English (at step S55).

The extracted paragraphs are translated from English into Japanese (at step S56).

Using to the input character string in Japanese and synonyms in Japanese expanded therefrom, paragraphs translated from English into Japanese are arranged (at step S57).

Figure 26:
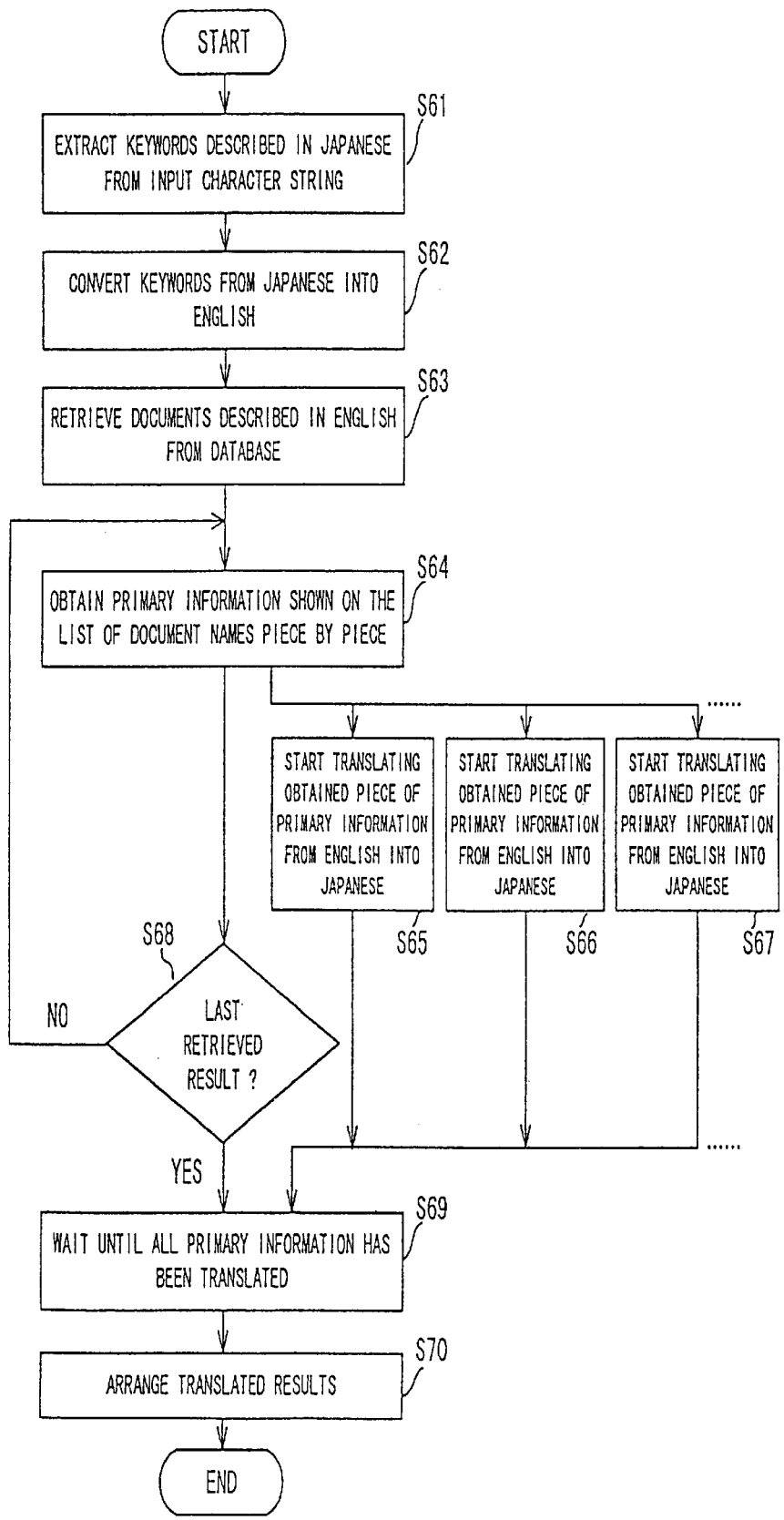
FIG. 26 is a flow chart showing a translating method for retrieved results according to the third embodiment of the present invention.

FIG. 26 is a flow chart showing a translating method for retrieved results according to the third embodiment of the present invention.

In FIG. 26, keywords described in Japanese are extracted from an input character string described in Japanese (at step S61).

The keywords are translated from Japanese into English (at step S62).

Using the keywords described in English, documents described in English are retrieved from a database described in English (at step S63). Thus, a list of English document names containing English keywords is obtained.

Primary information shown on the list is obtained piece by piece (at step S64).

Whenever one piece of the primary information is obtained, the obtained piece of primary information is translated from English into Japanese (at steps S65 to S67). In addition, it is determined whether or not the obtained piece of primary information is the last retrieved result (at step S68). When the obtained piece of primary information which begins to be translated from English into Japanese is the last retrieved result, the system waits until all received primary information has been translated (at step S69).

After the translating process from English into Japanese has been completed (at step S70), using the input character string and keywords described in Japanese, the documents translated from English into Japanese are arranged (at step S70).

When the translating process and the document information obtaining process are performed in parallel as separated processes, even if it takes a time to obtain primary information through a network and so forth, the process time can be shortened.

Next, an outputting method for retrieved results according to an embodiment of the present invention will be described in detail.

Figure 27A:
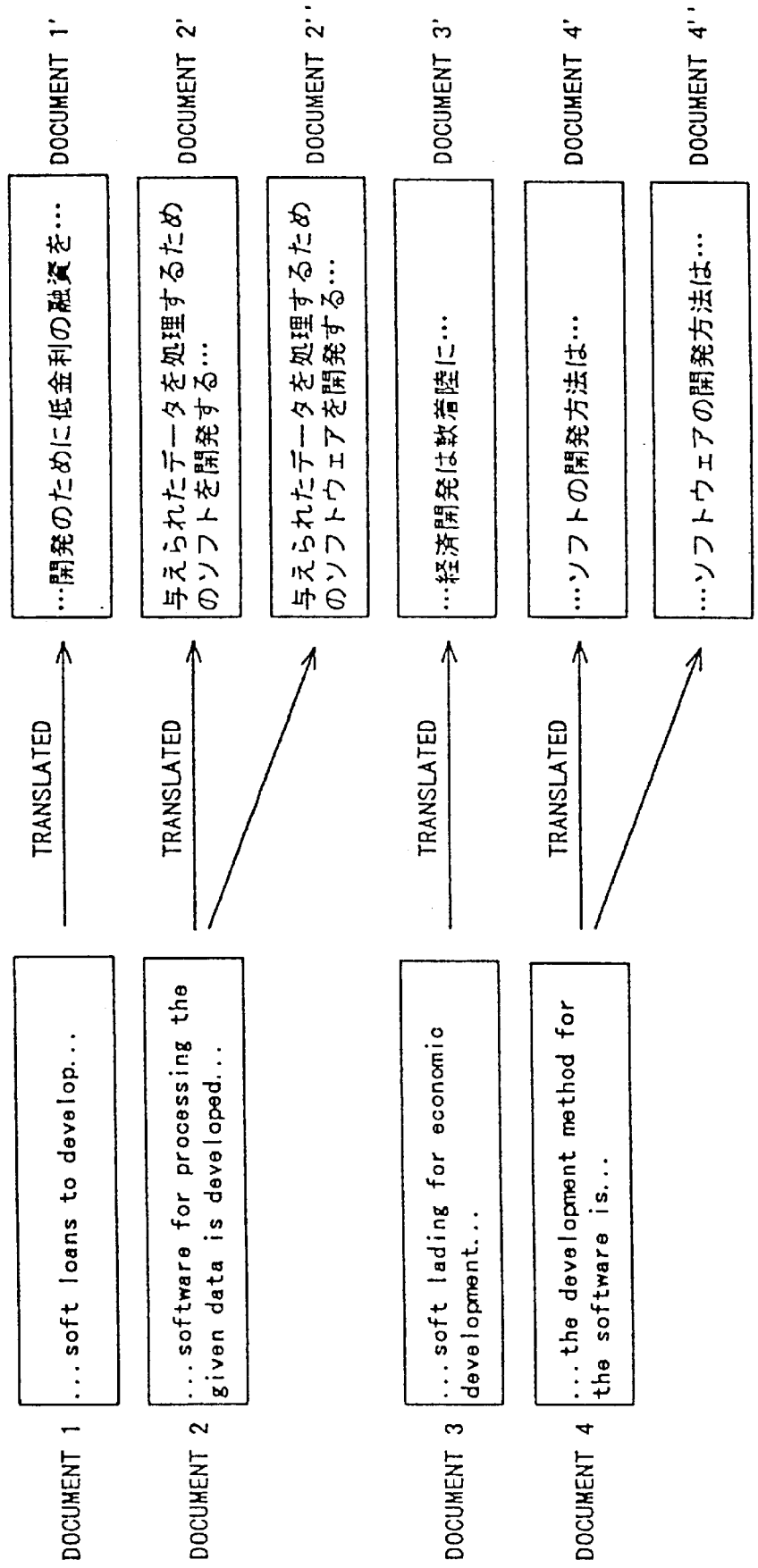
FIG. 27A is a schematic diagram for explaining an outputting method for retrieved results according to the first embodiment of the present invention.

FIG. 27A is a schematic diagram for explaining an outputting method for retrieved results according to the first embodiment of the present invention.

In FIG. 27A, keywords "soft", "software", "develop", and "development" described in English are generated corresponding to a character string "ソフトの開発" described in Japanese. Using the keywords described in English, document 1 to document 4 are retrieved. The document 1 contains a character string "soft loans to develop". The document 2 contains a character string "software for processing the given data is developed". The document 3 contains a character string "soft landing economic development". The document 4 contains a character string "the development method for the software is".

By translating the document 1 from English into Japanese, a document 1' containing a character string "開発のために低い金利の融資を" is obtained. When the document 2 is translated from English into Japanese, there are two translated words "ソフト" and "ソフトウェア" corresponding to the keyword "software", translated sentences corresponding to these translated words are generated. In other words, a document 2' containing a character string "与えられたデータを処理するためのソフトを開発する" and a document 2" containing a character string "与えられたデータを処理するためのソフトウェアを開発する" are generated. By translating the document 3' from English into Japanese, a document 3' containing a character string "経済開発は軟着陸に" is obtained. As with the document 2, when the document 4 is translated from English into Japanese, there are two translated words "ソフト" and "ソフトウェア" corresponding to the keyword "software", translated sentences corresponding to these translated words are generated. In other words, a document 4' containing a character string "ソフトの開発方法は" and a document 4" containing a character string "ソフトウェアの構築方法は" are generated.

When a keyword is translated from English into Japanese and a plurality of translated words are obtained, since translated sentences which use expanded results of these translated words are generated, regardless of whether the input keyword is "ソフトの開発" or "ソフトウェアの開発", a document with higher adaptivity can be highly ranked.

FIG. 27B is a schematic diagram for explaining an outputting method for retrieved results according to the second embodiment of the present invention.

In FIG. 27B, English keywords "soft", "software", "develop", and "development" are generated corresponding to an input character string "ソフトの開発" described in Japanese. Using these English keywords, documents 1 to 4 are retrieved. The document 1 contains a character string "soft loans to develop". The document 2 contains a character string "software for processing the given data is developed". The document 3 contains a character string "soft landing economic development". The document 4 contains a character string "the development method for the software is".

By translating the document 1 from English into Japanese, a document 1' containing a character string "開発のために低金利の融資を" is obtained. When the document 2 is translated from English into Japanese, since there are two translated words "ソフト" and "ソフトウエア" corresponding to the keyword "software", a translated sentence containing both translated words is generated. In other words, a document 2' containing a character string "与えられたデータを処理するためのソフト／ソフトウエアを開発する" is generated. By translating the document 3 from English into Japanese, a document 3' containing a character string "経済開発は軟着陸に" is obtained. When the document 4 is translated from English into Japanese, there are two translated words "ソフト" and "ソフトウエア" corresponding to the keyword "software", a translated sentence containing both the translated words is generated. In other words, a document 4' containing a character string "ソフト／ソフトウエアの開発方法は" is generated.

When a keyword is translated from English into Japanese, if a plurality of translated words are obtained, by placing the translated words in one translated sentence, a plurality of words translated into Japanese which come from the same English word are prevented from being selected at a time. Thus, documents can be accurately retrieved.

FIG. 28A is a schematic diagram for explaining an outputting method for retrieved results according to the third embodiment of the present invention.

In FIG. 28A, a character string "ソフトの開発" is input as a retrieval request. By analyzing morphological elements of the character string "ソフトの開発", keywords "ソフト" and "開発" are extracted. By converting the keyword "ソフト" from Japanese into English, English keywords "soft" and "software" are obtained. By converting the keyword "開発" from Japanese into English, English keywords "expand" and "expansion" are obtained.

Using the obtained keywords described in English, documents 1 to 4 described in English are retrieved. By converting the documents 1 to 4 from English into Japanese, documents 1' to 4' are obtained, respectively. By comparing the documents 1' to 4' converted from English into Japanese with the keywords "ソフト" and "開発" described in Japanese, the document 4', the document 2', the document 3', and the document 1' are highly ranked in the order thereof.

The document 4' contains a character string "ソフトの開発方法は". In this embodiment, the character strings "ソフト" and "開発" that match the keywords described in Japanese are highlighted in the document 4'.

The document 2' contains a character string "与えられたデータを処理するためのソフトを開発する". In this case, the character strings "ソフト" and "開発" that match the keywords described in Japanese are highlighted in the document 2'.

The document 3' contains a character string "経済開発は軟着陸に". In this case, the character string "開発" that matches the keyword described in Japanese is highlighted in the document 3'.

The document 1' contains a character string "開発のために低い金利の融資を". In this case, the character string "開発" that matches the keyword described in Japanese is highlighted in the document 1'.

A character string may be highlighted by enclosing the character string to be highlighted with a box, by underlining the character string to be highlighted, by making the character string to be highlighted bigger than the other character strings, by the character size or using characters, by changing the color of the character string to be highlighted to other than that of the other character strings, and so forth.

By highlighting a character string that matches a keyword, the user can easily know whether or not a desired document has been retrieved. Thus, the operability of the retrieving process using keywords can be improved.

FIG. 28B is a schematic diagram for explaining an outputting method for retrieved results according to a fourth embodiment of the present invention.

In FIG. 28B, a character string "ソフトの開発" is input as a retrieval request. By analyzing morphological elements of the character string "ソフトの開発", keywords "ソフト" and "開発" are extracted. When the keyword "開発" is expanded into synonyms, another keyword "構築" is obtained as a synonym. By converting the keyword "ソフト" from Japanese into English, English keywords "soft" and "software" are obtained. By converting the keyword "開発" from Japanese into English, English keywords "develop" and "development" are obtained. By converting the keyword "構築" from Japanese into English, English keywords "construct" and "construction" are obtained.

Using the English keywords, documents described in English are retrieved from the database. By converting the retrieved documents from English into Japanese, documents described in Japanese are obtained. By comparing the documents described in Japanese with the Japanese keywords "ソフト", "開発" and "構築", the document 4', the document 9', the document 3', and the document 1' are highly ranked in the order thereof.

The document 4' contains a character string "ソフトの開発方法は". In this case, the character strings "ソフト" and "開発" that match the Japanese keyword are highlighted in the document 4'.

The document 9' contains a character string "与えられたデータを処理するためのソフトを開発する". In this case, the character string "ソフト" that matches the Japanese keyword and the character string "構築" that matches as the synonym expanded from the keyword are highlighted in the document 9'. In this case, to clarify that the character string "構築" is a synonym expanded from the keyword, the character strings "構築" and "ソフト" are highlighted in different manners. For example, the character string "開発" is highlighted with a box, whereas the character string "構築" is highlighted with hatched lines. Alternatively, the character strings "開発" and "構築" may be highlighted with different colors.

The document 3' contains a character string "経済開発は軟着陸に". In this case, the character string "開発" that matches the Japanese keyword is highlighted in the document 3'.

The document 1' contains a character string "開発のために低い金利の融資を". In this case, the character string "開発" that matches the Japanese keyword is highlighted in the document 1'.

Since an input keyword and a keyword obtained by expanding into synonyms therefrom are highlighted in different manners, the user can easily know whether documents retrieved in a wide range match a desired document. Thus, the operability of the retrieving process using keywords can be improved.

FIG. 29 is a schematic diagram for explaining an outputting method for retrieved results according to a fifth embodiment of the present invention.

Figure 29A:
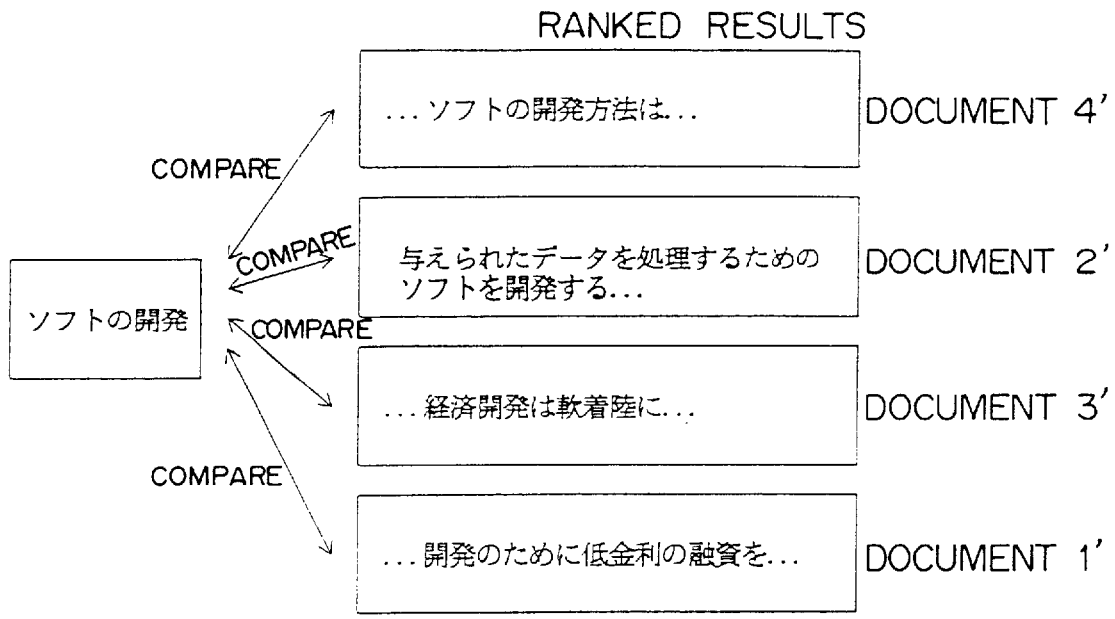
FIG. 29A is a schematic diagram for explaining a ranking method for translated results according to an embodiment of the present invention.
Figure 29B:
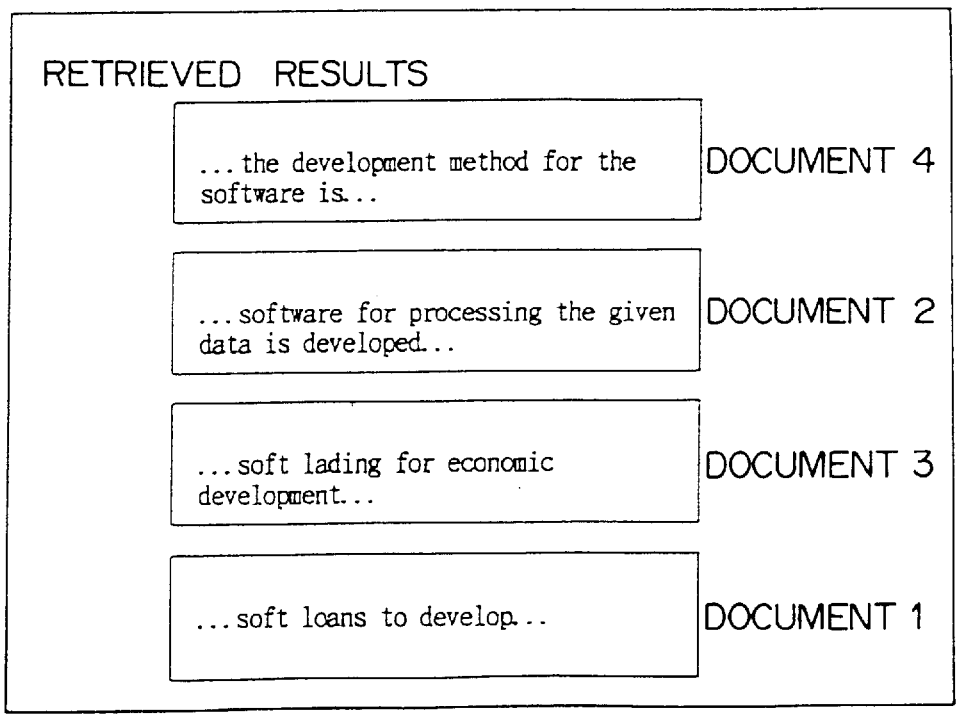
FIG. 29B is a schematic diagram for explaining an outputting method for retrieved results according to a fifth embodiment of the present invention.

In FIG. 29A, a character string "ソフトの開発" is input as a retrieval result. By analyzing morphological elements of the character string "ソフトの開発", keywords "ソフト" and "開発" are extracted. Keywords described in English are retrieved from a Japanese-English dictionary corresponding to the extracted keywords described in Japanese. Using the keywords described in English, document 1 to document 4 shown in FIG. 29B are retrieved.

The document 1 contains a character string "soft loans to develop". The document 2 contains a character string "software for processing the given data is developed". The document 3 contains a character string "soft landing economic development". The document 4 contains a character string "the development method for the software is".

The document 1 to document 4 described in English are converted from English into Japanese. Thus, a document 1' to a document 4' described in Japanese are generated. The document 1' contains a character string "開発のために低い金利の融資を". The document 2' contains a character string "与えられたデータを処理するためのソフトを開発する". The document 3' contains a character string "経済開発は軟着陸に". The document 4' contains a character string "ソフトの開発方法は".

The document 1' to document 4' are compared with the Japanese character string "ソフトの開発" and then ranked in the order of the document 4', the document 2', the document 3', and the document 1'.

When the ranked results are presented to the user, the document 1 to document 4 that have not been translated into Japanese are presented in the ranked order of the document 1' to 4' described in Japanese (in other words, the documents 1' to document 4' described in Japanese are not presented).

FIG. 29B shows presented results of the document 1 to document 4.

In FIG. 29B, the document 4, the document 2, the document 3, and the document 1 are displayed in the order thereof. This order of which the document 1 to document 4 are displayed matches the ranked order of the document 1' to document 4' shown in FIG. 29A. This presenting method is effective when the conversion process from the database side format into the input side format is not accurately performed and thereby the converted document 1' to translated document 4' cannot be presented as they are.

Next, a retrieving method for multi-language documents according to an embodiment of the present invention will be described.

Figure 30A:
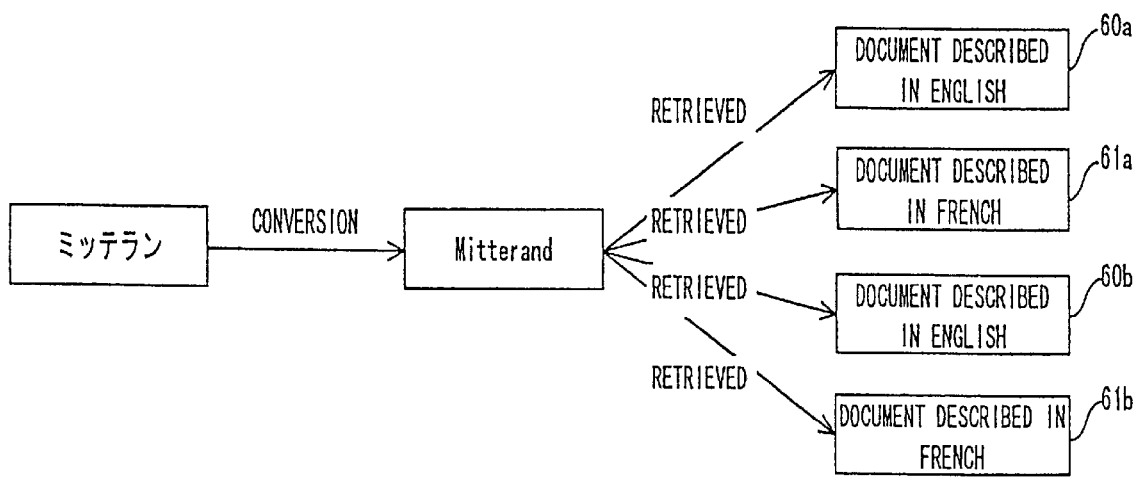
FIG. 30A is a schematic diagram for explaining a retrieving method for multi-language documents according to the first embodiment of the present invention.

FIG. 30A is a schematic diagram for explaining a retrieving method for multi-language documents according to the first embodiment of the present invention.

In FIG. 30A, a keyword "ミッテラン" described in Japanese is input. Based on the keyword described in Japanese, data is retrieved from a database described in English and a database described in French. In this case, the keyword "ミッテラン" described in Japanese is converted into an alphabetic keyword "Mitterrand". Using the alphabetic keyword "Mitterrand", data is retrieved from the database described in English and the database described in French. Thus, documents 60a and 60b (described in English) that contain a character string "Mitterrand" and documents 61a and 61b (described in French) that contain a character string "Mitterrand" are retrieved. The documents 60a and 60b described in English and the documents 61a and 61b described in French are converted into Japanese.

Figure 30B:
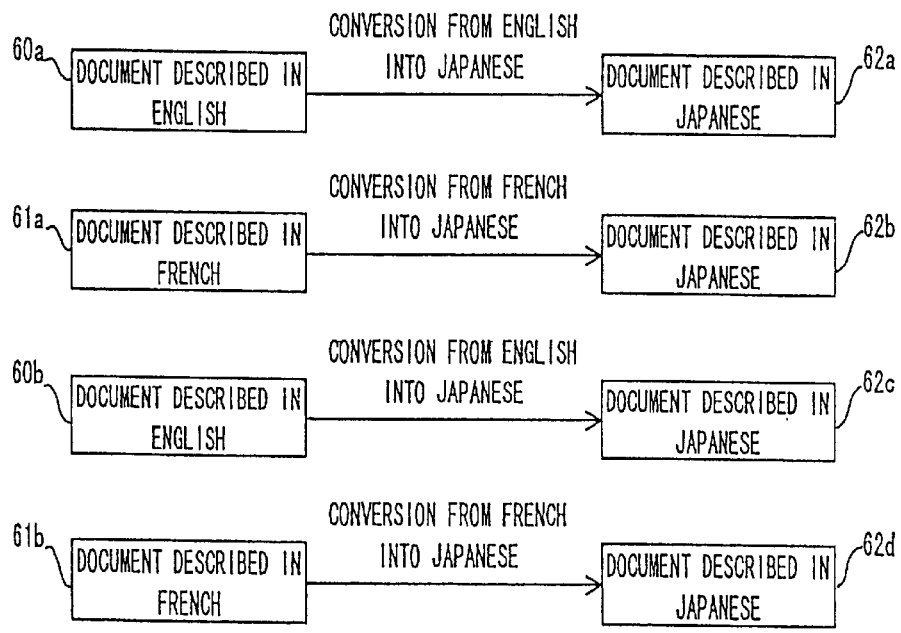
FIG. 30B is a schematic diagram for explaining a conversion method for multi-language documents according to the first embodiment of the present invention.

FIG. 30B is a schematic diagram for explaining a converting method for multi-language documents according to the first embodiment of the present invention.

In FIG. 30B, the languages of the retrieved documents 60a and 60b (described in English) and documents 61a and 61b (described in French) are determined. Based on the determined results, converting dictionaries and converting rules are selected. Thus, the documents are converted from English and French into Japanese. In this case, the documents 60a and 60b described in English and the documents 61a and 61b described in French are converted into Japanese. Consequently, documents 62a to 62d described in Japanese are obtained. By comparing the contents of the documents 62a to 62d described in Japanese with the keyword "ミッテラン" described in Japanese, the documents 62a to 62d described in Japanese are ranked.

FIG. 31 is a schematic diagram showing displayed results of multi-language documents according to the first embodiment of the present invention.

In FIG. 31, a character string "ソフトの開発" is input as a retrieval request. By analyzing morphological elements of the character string "ソフトの開発", keywords "ソフト" and "開発" are extracted. The keywords "ソフト" and "開発" are converted from Japanese into English and French.

Documents described in English are retrieved from a database described in English using the keywords described in English obtained by the conversion. Documents described in French are retrieved from a database described in French using the keywords described French obtained by the conversion. The retrieved documents described in English and the retrieved documents described in French are translated into Japanese and the translated results are displayed. In this case, the information (described in English) retrieved from the database (described in English) and the information (described in English) retrieved from the database (described in French) are separately displayed. In addition, the languages of the databases from which the information is retrieved are also displayed.

Thus, a document containing a character string "経済開発は軟着陸に" and a document containing a character string "ソフトの開発方法は" are displayed below the field of a character string "英語データベースからの検索結果の翻訳結果 (Translated results of retrieved results from database described in English)". In addition, a document containing a character string "データを処理用のソフトを開発する" and a document containing a character string "開発用の低金利融資を" are displayed below the field of a character string "フランス語データベースからの検索結果の翻訳結果 (Translated results of retrieved results from database described in French)".

Information of a plurality of database side formats is separately displayed. In addition, the types of database side formats are displayed corresponding to the information in the database side format. Thus, the user can easily know the sources of information that is displayed.

Figure 32:
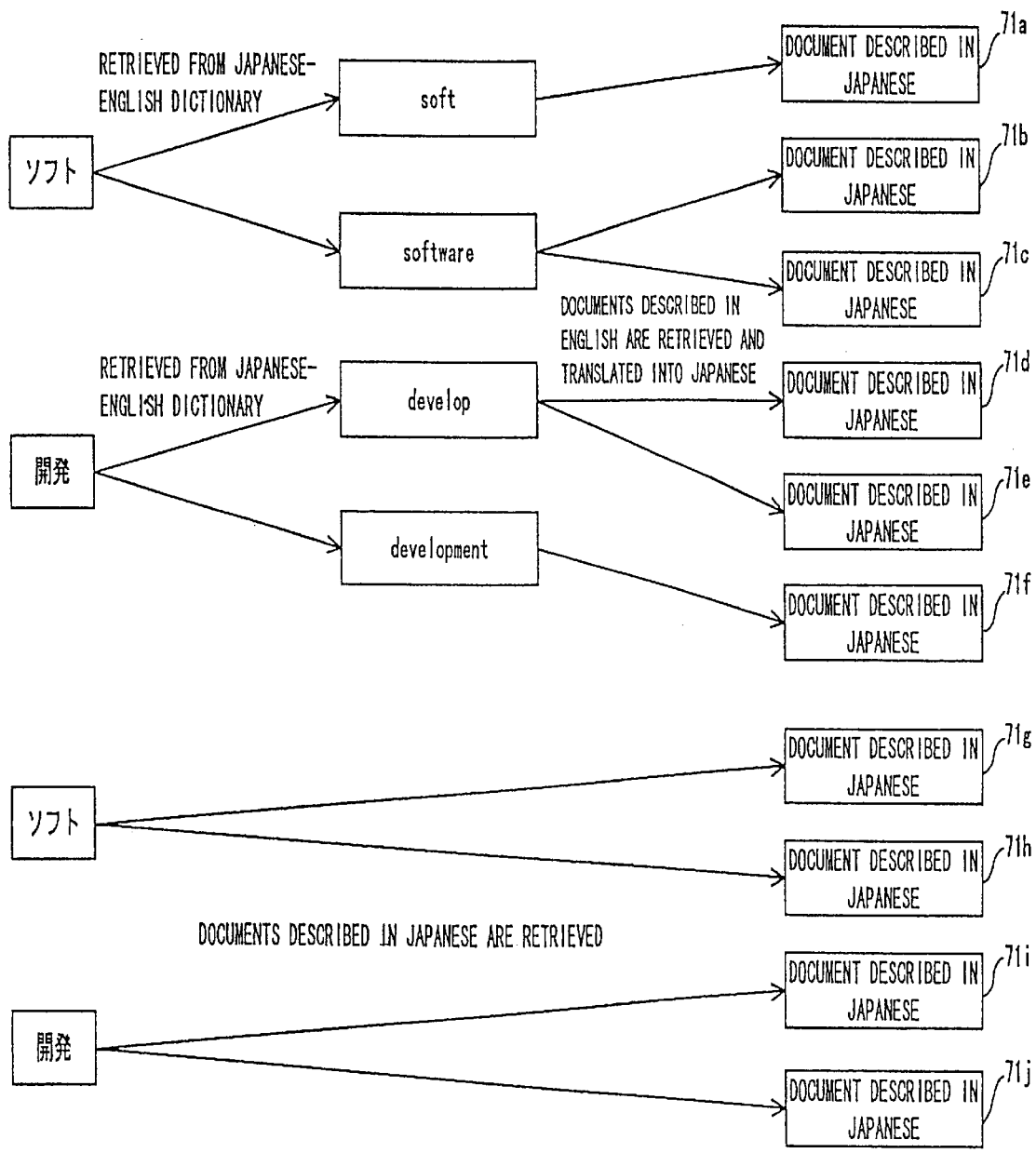
FIG. 32 is a schematic diagram showing a retrieving method for multi-language documents according to the second embodiment of the present invention.

FIG. 32 is a schematic diagram for explaining a retrieving method for multi-language documents according to the second embodiment of the present invention.

In FIG. 32, a character string "ソフトの開発" is input as a retrieval request. By analyzing morphological elements of the character string "ソフトの開発", keywords "ソフト" and "開発" are extracted.

Using the keywords "ソフト" and "開発", documents 71g to 71j described in Japanese are retrieved from a database described in Japanese.

By converting the keyword "ソフト" from Japanese into English, English keywords "soft" and "software" are generated. By converting the keyword "開発" from Japanese into English, English keywords "develop" and "development" are generated. Using the keywords described in English, documents described in English are retrieved. By converting the retrieved documents from English into Japanese, documents 71a to 71f described in Japanese are obtained.

After the documents 71a to 71j described in Japanese have been obtained, by comparing the keywords "ソフト" and "開発" with the documents 71a to 71j described in Japanese, the documents 71a to 71f and the documents 71g to 71j are ranked together.

By ranking retrieved results of multi-language documents using keywords described in Japanese, information can be obtained from a variety of documents.

Figure 33:
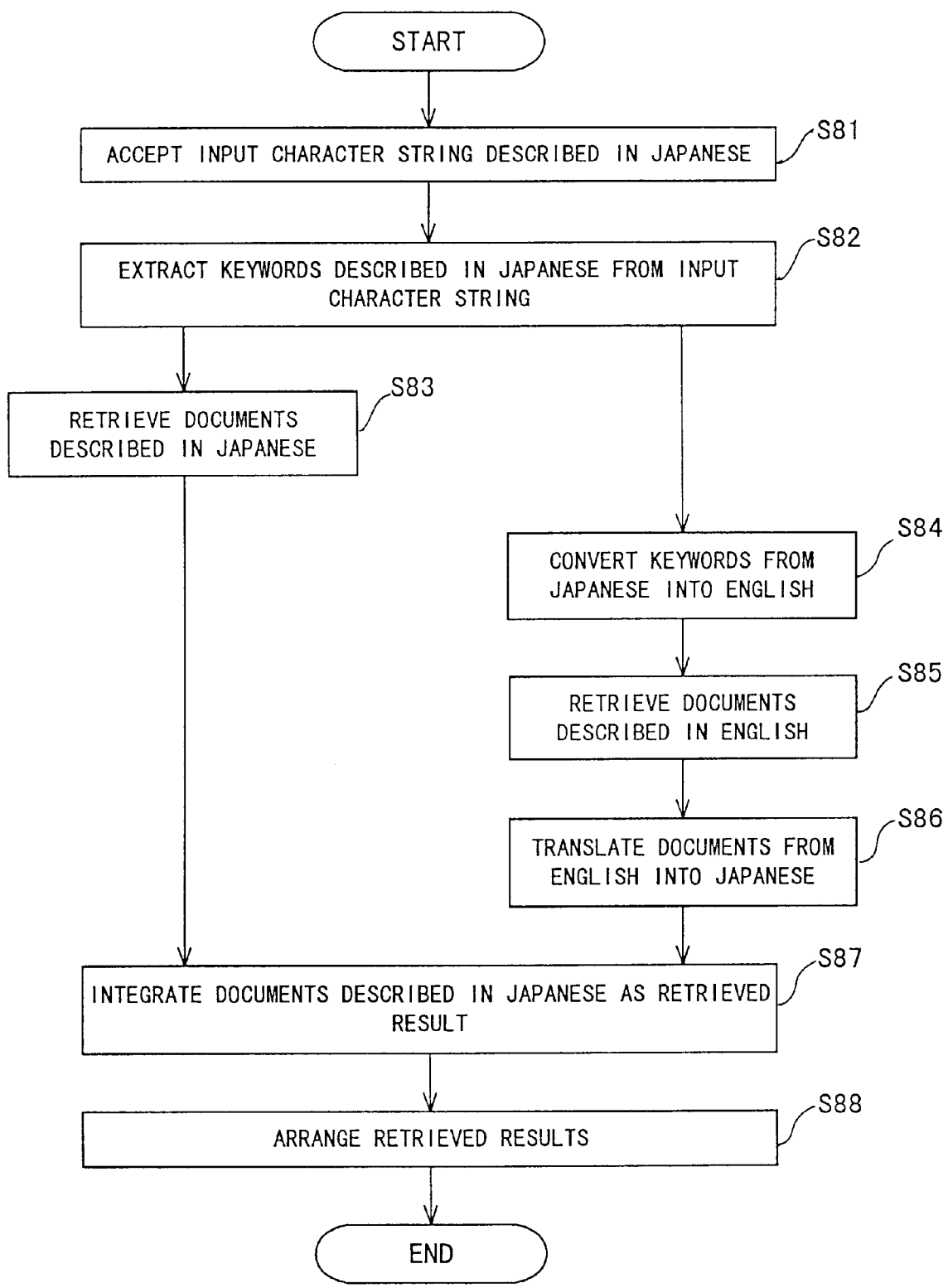
FIG. 33 is a flow chart showing the retrieving method for multi-language documents according to the second embodiment of the present invention.

FIG. 33 is a flow chart showing a retrieving method for multi-language documents according to the second embodiment of the present invention.

In FIG. 33, an input character string described in Japanese is accepted (at step S81).

Keywords described in Japanese are extracted from the input character string described in Japanese (at step S82).

Using the keywords described in Japanese, documents described in Japanese are retrieved from a database described in Japanese (at step S83).

The keywords are converted from Japanese into English (at step S84).

Using the converted keywords described in English, documents described in English are retrieved from a database described in English (at step S85).

The documents are translated from English into Japanese (at step S86).

The retrieved documents described in Japanese and the translated documents described in Japanese are integrated (at step S87).

Using the input character string described in Japanese and the keywords described in Japanese, the retrieved documents described in Japanese and the translated documents described in Japanese are arranged together (at step S88).

FIG. 34 is a schematic diagram showing displayed results of multi-language documents according to the second embodiment of the present invention.

In FIG. 34, a character string "ソフトの開発" is input as a retrieval request. By analyzing morphological elements of the character string "ソフトの開発", keywords "ソフト" and "開発" are extracted.

Using the keywords "ソフト" and "開発", a document containing a character string "開発のために低金利の融資を" and a document containing a character string "与えられたデータを処理するためのソフトを開発する" are retrieved from a database described in Japanese.

By converting the keyword "ソフト" from Japanese into English, English keywords "soft" and "software" are generated. By converting the keyword "開発" from Japanese into English, keywords "expand" and "expansion" are generated. Using the keywords described in English, documents described in English are retrieved. By converting the retrieved documents from English into Japanese, a document containing a character string "経済開発は軟着陸に" and a document containing a character string "ソフトの開発方法は" are obtained.

A document containing a character string "開発のために低い金利の融資を" and a document containing a character string "与えられたデータを処理するためのソフトを開発する" are displayed below the field of a character string "日本語データベースからの検索結果 (Retrieved results from database in Japanese)". In addition, a document containing a character string "経済開発は軟着陸に" and a document containing a character string "ソフトの開発方法は" are displayed below the field of a character string "英語データベースからの検索結果の翻訳結果 (Translated result of retrieved results from database in English)".

As described above, according to the present invention, even if the data format of retrieved results is different from the data format of a retrieval request, since the retrieved results are evaluated in the data format of the retrieval request, the retrieved results can be arranged without need to convert the data format of the retrieval request. Thus, data just corresponding to the retrieval request can be retrieved free of a variation in meaning caused by a translating process of the data format of the retrieval request.

In addition, according to an embodiment of the present invention, since key information is extracted in a first data format, key information can be extracted free of a variation in meaning caused by a conversion process of data in comparison with the case that key information extracted after the data format is converted into a second data format. Thus, the key information can be extracted just corresponding to a retrieval request.

In addition, according to an embodiment of the present invention, since a retrieval request is expanded in a first data format, the retrieval request can be expanded free of a variation in meaning caused by a conversion process of data in comparison with the case that the retrieval request is expanded after the data format is converted into a second data format.

In addition, according to an embodiment of the present invention, since a logical operation of a retrieval request is performed in a first data format, the logical operation can be performed free of a variation in meaning of a conversion process of data in comparison with the case that the logical operation is performed after the data format is converted into a second data format. Thus, the logical operation can be performed just corresponding to the retrieval request.

In addition, according to an embodiment of the present invention, since results converted into a first data format are compared with key information, expanded results, or results of a logical operation described in the first data format, retrieved results can be determined without need to convert the data format of the key information, the expanded results, or the results of the logical operation. Thus, the retrieved results can be determined just corresponding to the retrieval request free of a variation of a nuance occurred by a translating process thereof.

In addition, according to an embodiment of the present invention, since retrieved results are ranked based on determined results thereof, the retrieved results can be easily selected.

In addition, according to an embodiment of the present invention, since the data format of results retrieved from a database is matched with the data format of a retrieval request, even if the retrieval request whose data format is different from the data format of the database is input, the retrieval request can be directly compared with converted results of the retrieved results without need to convert the data format of the retrieval request. Thus, the retrieved results just corresponding to the retrieval request can be extracted.

In addition, according to an embodiment of the present invention, since the language of retrieved results is matched with the language of a retrieval request, even if the language of an input keyword is different from the language of a database from which data is retrieved, results retrieved from the database can be determined in the language of the input keyword. Thus, the accuracy of a data retrieving process through a machine-translating process can be improved.

In addition, according to an embodiment of the present invention, since a database side language is automatically determined, results retrieved from the database can be converted into the language of the retrieval request without need to recognize the language of the database to be retrieved from on the retrieval request side. Thus, the results retrieved from the database can be determined based on the language on the retrieval request side.

In addition, according to an embodiment of the present invention, since only sentences containing a retrieval keyword are converted, information irrelevant to a retrieval request is discarded before performing the conversion process. Thus, the process time of the retrieving process through a machine-translating process can be shortened.

In addition, according to an embodiment of the present invention, since a conversion process is performed only for paragraphs containing a retrieval keyword, information irrelevant to a retrieval request is discarded before performing the conversion process. Thus, the process time of the retrieving process through a machine-translating process can be shortened.

In addition, according to an embodiment of the present invention, since a weight is assigned to expanded results, if a plurality of retrieved results corresponding to expanded results are obtained, the retrieved results can be easily arranged corresponding to the contents of the expanded results.

In addition, according to an embodiment of the present invention, since a weight is assigned to converted results of retrieval requests, if a plurality of retrieved results corresponding to converted results of retrieval requests are obtained, the retrieved results can be easily arranged corresponding to the contents of the converted results of the retrieved results.

In addition, according to an embodiment of the present invention, since data is retrieved based on each of a plurality of retrieval information generated from a retrieval request, all information relevant to the retrieval request can be retrieved. Thus, all information relevant to the retrieval request can be presented.

In addition, according to an embodiment of the present invention, since results retrieved from a database are converted corresponding to each of a plurality of alternatives of which are obtained in a conversion process, even if a variation in meaning takes place due to a conversion process of a data format, all candidates generated due to the variation in meaning can be presented. Thus, data can be prevented from being lost against a variation in meaning caused by a conversion process of a data format. Thus, the accuracy of the retrieving process can be improved.

In addition, according to an embodiment of the present invention, since redundantly retrieved results are discarded by selecting at the most one converted result for the same retrieved result, the retrieving process can be effectively performed.

In addition, according to an embodiment of the present invention, since a plurality of candidates obtained in a conversion process are selectively contained in retrieved results, even if a variation in meaning takes place in the conversion process of a data format, all candidates generated due to the variation in meaning can be presented in the same retrieved result. Thus, the accuracy of the retrieving process can be improved.

In addition, according to an embodiment of the present invention, since the correlation rates of a retrieval request and retrieved results are calculated in an input side format, the retrieved results just corresponding to the retrieval request can be easily selected.

In addition, according to an embodiment of the present invention, since a portion which matches an input keyword is highlighted in displaying the retrieved results, the user can directly know the correlation of the retrieved results and the input keyword. Thus, the user can easily know retrieved results that match the input keyword.

In addition, according to an embodiment of the present invention, since a portion that matches an input keyword and a portion that matches expanded results of the input keyword are separately highlighted. Thus, the correlation of the retrieved results and the input keyword can be displayed over a wide range. Consequently, retrieved results relevant to the input keyword can be easily obtained.

In addition, according to an embodiment of the present invention, since a database retrieving process and a conversion process are performed in parallel, data can be converted from a database side format into an input side format, sentence by sentence. Thus, the conversion process is performed before all sentences are retrieved. Consequently, the conversion process can be performed at high speed.

In addition, according to an embodiment of the present invention, since retrieved results are arranged in an input side format and retrieved results are displayed in a database side format, even if converted results cannot be presented due to an abnormality of the conversion process of the data format, a ranking process can be performed in the input side format.

In addition, according to an embodiment of the present invention, since data is ranked in an input side format based on ranked results in a database side format, retrieved results that are lowly ranked in the database side format can be suppressed from being converted. Thus, the process time necessary for the retrieving process through the data conversion process can be shortened.

In addition, according to an embodiment of the present invention, since data is retrieved from a plurality of databases whose database side formats are different based on a retrieval request described in an input side format, even if the plurality of databases are described in various data formats, data can be retrieved from these databases at the sametime based on one retrieval request. Retrieved results described in various data formats can be evaluated in the input side format.

In addition, according to an embodiment of the present invention, since the types of data formats are displayed corresponding to results retrieved from a database, even if the retrieved results are displayed in the input side format, the data format of the database can be recognized.

In addition, according to an embodiment of the present invention, since data is retrieved from a database described in an input side format and from another database described in a database side format based on a retrieval request described in the input side format, data relevant to the retrieval request can be retrieved in a wide range.

In addition, according to an embodiment of the present invention, since data is retrieved from a database described in an input side format and from another database described in a database side format based on a retrieval request described in the input side format and retrieved results are separately displayed on the same screen, databases from which data is retrieved can be easily distinguished.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information retrieving apparatus, comprising:
   an inputting unit inputting a retrieval request described in a first data format;
   an expansion unit expanding the retrieval request described in the first data format into expanded results described in the first data format based on expansion rules;
   a generating unit generating retrieval information described in a second data format based on the expanded results described in the first data format;
   a retrieving unit retrieving data from a document database which stores documents described in the second data format, based on the retrieval information described in the second data format;
   a converted results weight assigning unit assigning a weight to the retrieval information described in the second data format based on parts of speech of the retrieval request described in the first data format;
   a conversion unit converting one or more of the retrieved data from the second data format into the first data format based on the weight assigned to the retrieval information corresponding to the retrieved data; and
   an evaluating unit calculating a correlation rate between the retrieval request described in the first data format and the one or more retrieved data converted into the first data format by comparing the one or more retrieved data with the retrieval request and evaluating the one or more retrieved data based on the correlation rate.

2. The information retrieving apparatus as set forth in claim 1,
   wherein said generating unit has an extracting unit extracting key information described in the first data format from the retrieval request so as to generate the retrieval information described in the second data format based on the key information.

3. The information retrieving apparatus as set forth in claim 2,
   wherein said generating unit has a logical operation unit performing a logical operation for the key information in the first data format so as to generate the retrieval information described in the second data format based on results of the logical operation.

4. The information retrieving apparatus as set forth in claim 3,
   wherein said evaluating unit evaluates the one or more retrieved data converted into the first data format based on the results of the logical operation.

5. The information retrieving apparatus as set forth in claim 2,
   wherein said evaluating unit evaluates the one or more retrieved data converted into the first data format based on the key information.

6. The information retrieving apparatus as set forth in claim 1,
   wherein said generating unit has a logical operation unit performing a logical operation for the expanded results in the first data format so as to generate the retrieval information described in the second data format based on results of the logical operation.

7. The information apparatus as set forth in claim 6,
   wherein said evaluating unit evaluates the one or more retrieved data converted into the first data format based on the results of the logical operation.

8. The information retrieving apparatus as set forth in claim 1,
   wherein said evaluating unit evaluates the one or more retrieved data converted into the first data format based on the expanded results.

9. The information retrieving apparatus as set forth in claim 1,
   wherein said evaluating unit has a ranking unit ranking the one or more retrieved data based on the evaluated results thereof.

10. An information retrieving apparatus, comprising:
    a retrieval request inputting unit inputting a retrieval request described in a first data format;
    an expansion unit expanding the retrieval request described in the first data format into expanded results described in the first data format based on expansion rules;
    a first format converting unit converting the expanded results from the first data format into a second data format;
    a retrieving process unit retrieving data from a document database which stores documents described in the second data format, based on converted results of said first format converting unit;
    a converted results weight assigning unit assigning a weight to the converted results described in the second data format based on parts of speech of the retrieval request described in the first data format;
    a second format converting unit converting one or more of the retrieved results from the document database, from the second data format into the first data format based on the weight assigned to the converted results corresponding to the retrieved results;
    a retrieved result arranging unit calculating a correlation rate between the retrieval request described in the first data format and a retrieved result converted into the first data format by comparing the retrieved result with the retrieval request and arranging the retrieved results based on the correlation rate; and
    a retrieved result displaying unit displaying data arranged by said retrieved result arranging unit.

11. The information retrieving apparatus as set forth in claim 10,
    wherein the conversion between the first data format and the second data format is a language converting process or a dictionary retrieving process.

12. The information retrieving apparatus as set forth in claim 11, further comprising:
a language determining unit automatically determining a second data language,
wherein said second format converting unit performs a converting process or a dictionary retrieving process based on a determined result of said language determining unit.

13. The information retrieving apparatus as set forth in claim 11, further comprising:
a first extracting unit extracting sentences containing a retrieval keyword from the retrieved results of the document database,
wherein said second format converting unit converts only for the sentences extracted by said first extracting unit.

14. The information retrieving apparatus as set forth in claim 11, further comprising:
a second extracting unit extracting paragraphs containing a retrieval keyword from the retrieved results of the document database,
wherein said second format converting unit converts only for the paragraphs extracted by said second extracting unit.

15. The information retrieving apparatus as set forth in claim 10, further comprising:
an expanded results weight assigning unit assigning a weight to the expanded results,
wherein said retrieved result arranging unit arranges the one or more retrieved results converted into the first data format based on the weight assigned by said expanded results weight assigning unit.

16. The information retrieving apparatus as set forth in claim 10,
wherein said retrieved result arranging unit arranges the retrieved results converted into the first data format based on the weight assigned by said converted results weight assigning unit.

17. The information retrieving apparatus as set forth in claim 10,
wherein said retrieving process unit retrieves data based on retrieval information when the retrieval information is generated as the results converted by said first format converting unit.

18. The information retrieving apparatus as set forth in claim 10,
wherein if a plurality of candidates are generated for an element of a conversion result of said second format converting unit, said second format converting unit converts the retrieved results from the document database in correspondence with each of the plurality of candidates.

19. The information retrieving apparatus as set forth in claim 10,
wherein said retrieved result arranging unit has a selecting unit selecting at most one converted result for a corresponding retrieved result when a plurality of the converted results for corresponding retrieved results retrieved by said second format converting unit is generated.

20. The information retrieving apparatus as set forth in claim 10,
wherein if a plurality of candidates are generated for an element of a conversion result of said second format converting unit, said second format converting unit expands the plurality of candidates in the retrieved results from the document database.

21. The information retrieving apparatus as set forth in claim 10,
wherein said retrieved result arranging unit arranges the one or more retrieved results converted into the first data format based on results of a logical operation for the retrieval request described in the first data format.

22. The information retrieving apparatus as set forth in claim 10,
wherein said retrieved result arranging unit has a correlation rate calculating unit calculating the correlation rate of the retrieval request and the one or more retrieved results converted into the first data format so as to rank the one or more retrieved results converted into the first data format based on the correlation rate.

23. The information retrieving apparatus as set forth in claim 10,
wherein said retrieved result displaying unit has a first highlight displaying unit highlighting a portion that matches the retrieval request in the one or more retrieved results converted into the first data format.

24. The information retrieving apparatus as set forth in claim 10,
wherein said retrieved result displaying unit has a second highlight displaying unit separately highlighting a portion that matches the retrieval request and a portion that matches the expanded results of the retrieval request in the one or more retrieved results converted into the first data format.

25. The information retrieving apparatus as set forth in claim 10, further comprising:
a parallel processing unit processing data retrieval from the document database by said retrieving process unit in parallel with conversion of the retrieved result from the second data format into the first data format.

26. The information retrieving apparatus as set forth in claim 10,
wherein said retrieved result displaying unit displays the retrieved results described in the second data format based on results arranged by said retrieved result arranging unit.

27. An information retrieving apparatus, comprising:
a retrieval request inputting unit inputting a retrieval request described in a first data format;
an expansion unit expanding the retrieval request described in the first data format into expanded results described in the first data format based on expansion rules;
a first format converting unit converting the expanded results from the first data format into a second data format;
a retrieving process unit retrieving data from a document database, which stores documents described in the second data format, based on converted results by said first format converting unit;
a converted results weight assigning unit assigning a weight to the converted results described in the second data formats based on parts of speech of the retrieval request described in the first data format;
a first ranking unit ranking retrieved results from the document database in the second data format based on the weight assigned to the converted results corresponding to the retrieved results;
an extracting unit extracting higher ranked retrieved results based on the retrieved results ranked by said first ranking unit;

a second format converting unit converting one or more of the retrieved results extracted by said extracting unit from the second data format into the first data format according to the ranking of the retrieved results;

retrieved result arranging unit calculating a correlation rate between the retrieval request described in the first data format and the one or more retrieved results converted into the first data format by comparing the one or more retrieved results with the retrieval request and arranging the one or more retrieved results based on the correlation rate; and a retrieved result displaying unit displaying data arranged by said retrieved result arranging unit.

28. An information retrieving apparatus, comprising:

a retrieval request inputting unit inputting a retrieval request described in a first data format;

an expansion unit expanding the retrieval request described in the first data format into expanded results described in the first data format based on expansion rules;

a first format converting unit converting the expanded results from the first data format into a second data format;

a second format converting unit converting the expanded results from the first data format into a third data format;

a first retrieving process unit retrieving data from a first document database, which stores documents described in the second data format, based on converted results by said first format converting unit;

a second retrieving process unit retrieving data from a second document database, which stores documents described in the third data format, based on converted results by said second format converting unit;

a converted results weight assigning unit assigning a weight to the converted results described in the second and the third data formats based on parts of speech of the retrieval request described in the first data format;

a third format converting unit converting one or more of the retrieved results from the first document database, from the second data format into the first data format based on the weight assigned to the converted results corresponding to the retrieved results;

a fourth format converting unit converting one or more of the retrieved results from the second document database, from the third data format into the first data format based on the weight assigned to the converted results corresponding to the retrieved results;

a first retrieved result arranging unit calculating a first correlation rate between the retrieval request described in the first data format and the one or more retrieved results from the first document database converted into the first data format by comparing the one or more retrieved results from the first document database with the retrieval request and arranging the one or more retrieved results from the first document database converted into the first data format based on the first correlation rate;

a second retrieved result arranging unit calculating a second correlation rate between the retrieval request described in the first data format and the one or more retrieved results from the second document database converted into the first data format by comparing the one or more retrieved results from the second document database with the retrieval request and arranging the one or more retrieved results from the second document database converted into first data format based on the second correlation rate; and a retrieved result displaying unit displaying data arranged by said first retrieved result arranging unit and data arranged by said second retrieved result arranging unit.

29. An information retrieving apparatus, comprising:

a retrieval request inputting unit inputting a retrieval request described in a first data format;

an expansion unit expanding the retrieval request described in the first data format into expanded results described in the first data format based on expansion rules;

a first format converting unit converting the expanded results from the first data format into a second data format;

a retrieving process unit retrieving data from a document database, which stores documents described in the second data format, based on converted results by said first format converting unit;

a converted results weight assigning unit assigning a weight to the converted results described in the second data format based on parts of speech of the retrieval request described in the first data format;

a first ranking unit ranking retrieved results from the document database in the second data format based on the weight assigned to the converted results corresponding to the retrieved results;

an extracting unit extracting higher ranked retrieved results based on the retrieved results ranked by said first ranking unit;

a second format converting unit converting one or more of the retrieved results extracted by said extracting unit from the second data format into the first data format according to the ranking of the retrieved results;

a retrieved result arranging unit calculating a correlation rate between the retrieval request described in the first data format and the one or more retrieved results converted into the first data format by comparing the one or more retrieved results with the retrieval request and arranging the one or more retrieved results based on the correlation rate; and a retrieved result displaying unit displaying data arranged by said retrieved result arranging unit.

30. An information retrieving apparatus, comprising:

a retrieval request inputting unit inputting a retrieval request described in a first data format;

an expansion unit expanding the retrieval request described in the first data format into expanded results described in the first data format based on expansion rules;

a first format converting unit converting the expanded results from the first data format into a second data format;

a first retrieving process unit retrieving data from a first document database which stores documents described in the first data format, based on the expanded results described in the first data format;

a second retrieving process unit retrieving data from a second document database which stores documents described in the second data format based on converted results by said first format converting unit;

a converted results weight assigning unit assigning a weight to the converted results described in the second data format based on parts of speech of the retrieval request described in the first data format;

a second format converting unit converting one or more of the retrieved results from the second document database from the second data format into the first data format based on the weight assigned to the converted results corresponding to the retrieved results;

a retrieved result arranging unit calculating a correlation rate between the retrieval request described in the first data format and the one or more retrieved results converted into the first data format from the second document database by comparing the one or more retrieved results converted from the second document database into the first data format with the retrieval request and calculating a correlation rate between the retrieval request described in the first data format and the retrieved results from the first document database by comparing the retrieved results from the first document database in the first data format with the retrieval request and arranging the retrieved results from the first document database and the one or more retrieved results from the second document database converted into the first data format, based on the correlation rate; and a retrieved result displaying unit displaying data arranged by said retrieved result arranging unit.

31. The information retrieving apparatus as set forth in claim 30, wherein said retrieved result displaying unit separately displays the retrieved results from the first document database and the one or more retrieved results from the second document database and converted into the first data format on a same screen.

32. An information retrieving apparatus, comprising:

an inputting unit inputting a keyword described in a first language;

an expansion unit expanding the keyword described in the first language into expanded results described in the first language based on expansion rules;

a first converting unit converting the expanded results from the first language into converted results in a second language;

a retrieving unit retrieving data from a document database which stores documents described in the second language, based on the converted results in the second language;

a converted results weight assigning unit assigning a weight to the converted results described in the second language based on a part of speech of the keyword described in the first language;

a second converting unit converting one or more of retrieved results from the document database from the second language into the first language based on the weight assigned to the converted results corresponding to the retrieved results; and an evaluating unit calculating a correlation rate between the keyword described in the first language and the one or more retrieved results converted into the first language by comparing the one or more retrieved results with the keyword and evaluating the one or more retrieved results based on the correlation rate.

33. An information retrieving apparatus for retrieving data from a document database which stores documents described in a data format different from a data format in which a retrieval request is described by expanding the retrieval request in the same format as the retrieval request, retrieving data from the document database according to expanded results converted into the data format of the document database, assigning a weight to the converted expanded results, and converting one or more of retrieved results retrieved from the document database based on the weight assigned to the converted expanded results corresponding to the retrieved results, wherein said information retrieving apparatus matches the data format of the one or more retrieved results with the data format of the retrieval request and calculates a correlation rate between the described retrieval request and the one or more retrieved results by comparing the one or more retrieved results with the retrieval request and evaluates the one or more retrieved results based on the correlation rate.

34. An information retrieving method, comprising:

inputting key information described in a first data format;

expanding the key information described in the first data format into expanded results described in the first data format based on expansion rules;

converting the expanded results from the first data format into a second data format;

retrieving data from a document database, which stores documents described in the second data format, based on the expanded results converted into a second data format;

assigning a weight to the converted results based on parts of speech of the key information described in the first data format;

converting one or more of retrieved results from the second data format into the first data format based on the weight assigned to the converted results corresponding to the retrieved data; and calculating a correlation rate between the key information described in the first data format and the one or more retrieved results converted into the first data format by comparing the one or more retrieved results with the key information and evaluating the one or more retrieved results based on the correlation rate.

35. An information retrieving method, comprising:

retrieving, based on expanded results of an input keyword described in a first data format, data from a document database which stores documents described in a second data format;

assigning a weight to the expanded results converted into the second data format based on a part of speech of the input keyword described in the first data format;

converting one or more of retrieved results from the document database from the second data format into the first data format based on the weight assigned to the converted results corresponding to the retrieved results; and comparing the one or more retrieved results converted into the first data format with the input keyword described in the first data format; and calculating a correlation rate between the input keyword described in the first data format and the one or more retrieved results converted into the first data format by comparing the one or more retrieved results with the input keyword and determining whether or not the one or more retrieved results are valid based on the correlation rate.

36. An information retrieving method for retrieving, based on expanded results of an input keyword described in a first language, data from a document database which stores documents described in a second language by:

assigning a weight to the expanded results converted into the second language based on a part of speech of the input keyword described in the first language;

converting one or more of retrieved results from the document database in the second language into the first language based on the weight assigned to the converted results corresponding to the retrieved results, wherein evaluating the one or more retrieved results is performed by calculating a correlation rate between the input keyword described in the first language and the one or more retrieved results by comparing the one or more retrieved results with the input keyword.

37. A computer-readable storage medium storing instructions to direct a computer to perform a method for retrieving data from a document database, said method comprising:

retrieving, based on expanded results of an input keyword described in a first data format, data from the document database which stores documents described in a second data format;

assigning a weight to the expanded results converted into a second data format based on a part of speech of the input keyword described in the first data format;

converting one or more of retrieved results from the document database from the second data format into the first data format based on the weight assigned to the converted results corresponding to the retrieved results;

comparing the one or more retrieved results converted into the first data format with the input keyword described in the first data format; and calculating a correlation rate between the input keyword described in the first data format and the one or more retrieved results by comparing the one or more retrieved results with the input keyword and evaluating the one or more retrieved results based on the correlation rate.

* * * * *